(12) United States Patent
Chen et al.

(10) Patent No.: US 9,049,594 B2
(45) Date of Patent: Jun. 2, 2015

(54) METHOD AND DEVICE FOR KEY GENERATION

(71) Applicant: HUAWEI TECHNOLOGIES CO., LTD., Shenzhen (CN)

(72) Inventors: Xinyi Chen, Shenzhen (CN); Dongmei Zhang, Beijing (CN); Lijia Zhang, Beijing (CN); Xiaohan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/952,985

(22) Filed: Jul. 29, 2013

(65) Prior Publication Data

US 2013/0310006 A1    Nov. 21, 2013

Related U.S. Application Data

(63) Continuation of application No. PCT/CN2012/070743, filed on Jan. 29, 2012.

(30) Foreign Application Priority Data

Jan. 28, 2011   (CN) .......................... 2011 1 0031924

(51) Int. Cl.
*H04W 12/04* (2009.01)
*H04L 29/06* (2006.01)
*H04W 88/12* (2009.01)

(52) U.S. Cl.
CPC .............. *H04W 12/04* (2013.01); *H04W 88/12* (2013.01); *H04L 63/061* (2013.01); *H04L 2463/061* (2013.01)

(58) Field of Classification Search
USPC ........... 455/410, 411; 370/230, 235, 252, 328
See application file for complete search history.

(56) References Cited

U.S. PATENT DOCUMENTS

| 2010/0095123 A1 | 4/2010 | He |
| 2010/0130207 A1 | 5/2010 | Wu |
| 2012/0077501 A1 | 3/2012 | Zhang et al. |

FOREIGN PATENT DOCUMENTS

| CN | 101406024 A | 4/2009 |
| CN | 101754191 A | 6/2010 |

(Continued)

OTHER PUBLICATIONS

PCT International Search Report and Written Opinion of the International Searching Authority mailed May 3, 2012 in corresponding International Application No. PCT/CN2012/070743.

(Continued)

*Primary Examiner* — Sam Bhattacharya
(74) *Attorney, Agent, or Firm* — Staas & Halsey LLP

(57) ABSTRACT

A method and a device for key generation are disclosed in embodiments of the present invention. The method for key generation is applied to a UMTS-LTE resource convergence scenario that has a base station as an anchor point, and includes: deriving, according to a root key and a count value of an LTE system, or according to a random number and an LTE system root key, a UMTS integrity key and cipher key, and sending the UMTS integrity key and cipher key to a UMTS control node. The embodiments of the present invention enable the derivation of the UMTS integrity key and cipher key in a UMTS-LTE resource convergence scenario that has a base station as an anchor point, enable a user equipment to communicate securely through a UMTS, and further improve security of data transmitted in the UMTS.

25 Claims, 10 Drawing Sheets

Derive a UMTS integrity key and cipher key according to a root key and a count value of an LTE system, or according to a random number and an LTE system root key, a UMTS integrity key and cipher key — 101

Send the UMTS integrity key and cipher key to a UMTS control node — 102

(56) References Cited

FOREIGN PATENT DOCUMENTS

| CN | 101772019 A | 7/2010 |
|---|---|---|
| CN | 101931951 | 12/2010 |
| EP | 2416598 | 2/2012 |
| WO | WO2010/145685 | 12/2010 |

OTHER PUBLICATIONS

3rd *Generation Partnership Project; Technical Specification Group Services and System Aspects; Rationale and track of security decisions in Long Term Evolved (LTE) RAN/3GPP System Architecture Evolution (SAE)* (Release 9), 3GPP TR 33.821 V9.0.0, Jun. 2009, pp. 1-148.

3rd *Generation Partnership Project; Technical Specification Group Services and System Aspects; 3G Security; Security architecture* (Release 10), 3GPP TS 33.102 V10.0.0, Dec. 2010, pp. 1-72.

3rd *Generation Partnership Project; Technical Specification Group Services and System Aspects; 3GPP System Architecture Evolution (SAE); Security architecture* (Release 9), 3GPP TS 33.401 V9.6.0, Dec. 2010, pp. 1-105.

Extended European Search Report, dated Jan. 28, 2014, in corresponding European Application No. 12738754.6 (14 pages).

International Search Report mailed May 3, 2012 in corresponding International Application No. PCT/CN2012/070743.

METHOD AND DEVICE FOR KEY GENERATION

CROSS-REFERENCE TO RELATED APPLICATIONS

This application is a continuation of International Application No. PCT/CN2012/070743, filed on Jan. 29, 2012, which claims priority to Chinese Patent Application No. CN 201110031924.4, filed on Jan. 28, 2011, both of which are hereby incorporated by reference in their entireties.

TECHNICAL FIELD

Embodiments of the present invention relate to the field of communications technologies, and in particular, to a method and a device for key generation.

BACKGROUND

With development of long term evolution (Long Term Evolution, hereinafter briefly referred to as LTE), an LTE system and a universal mobile telecommunications system (Universal Mobile Telecommunications System, hereinafter briefly referred to as UMTS) will coexist on a network. In the UMTS-LTE hybrid networking scenario, the LTE system and the UMTS may be used together to transmit user services, thereby improving a transmission rate.

In a UMTS-LTE resource convergence (UMTS LTE Boosting, hereinafter briefly referred to as UL Boosting) scenario that has a base station (evolved NodeB, hereinafter briefly referred to as eNB) as an anchor point, the LTE system remains unchanged, and a radio network controller (Radio Network Controller, hereinafter briefly referred to as RNC) of an access network node on the UMTS accesses a core network of the LTE system by using an eNB. In this scenario, an access network of the UMTS and an access network of the LTE system exist but a core network of only the LTE system exists. A user equipment (User Equipment, hereinafter briefly referred to as UE) may transfer data to the core network by using network elements on the access networks of both the UMTS and the LTE system at the same time, thereby improving a service transmission rate.

In a UL Boosting scenario that has an eNB as an anchor point, an RNC and an eNB reserve current protocols in a relatively complete manner/to a great extent, and data of the LTE system and data of the UMTS converge at a packet data convergence protocol (Packet Data Convergence Protocol, hereinafter briefly referred to as PDCP) layer. In the prior art, the LTE system and the UMTS perform security protection on service data by using their own security protocol layer.

However, in a UL Boosting scenario that has an eNB as an anchor point, a UE performs an authentication and key agreement (Authentication and Key Agreement, hereinafter briefly referred to as AKA) with a core network through the LTE system and generates a key to the LTE system. But, in the UL Boosting scenario that has an eNB as an anchor point, only an access network of the UMTS exists and a core network of the UMTS does not exist. Therefore, the UMTS cannot perform authentication with the core network to generate a key to the UMTS. If the UMTS does not have a security key, data transmitted in the UMTS is not protected for security and is easily to be intercepted by attackers, thereby having low security.

SUMMARY

Embodiments of the present invention provide a method and a device for key generation, so as to implement the generation of a key to a UMTS in a UL Boosting scenario that has an eNB as an anchor point, thereby improving security of data transmitted in the UMTS.

An embodiment of the present invention provides a method for key generation, applied to a universal mobile telecommunications system (UMTS)-long term evolution (LTE) resource convergence scenario that has a base station as an anchor point, and including:

deriving, according to a root key and a count value of an LTE system, or according to a random number and an LTE system root key, a UMTS integrity key and cipher key; and sending the UMTS integrity key and cipher key to a UMTS control node, so that the UMTS control node implements cipher and integrity protection by using the UMTS integrity key and cipher key.

An embodiment of the present invention further provides a method for key generation, applied to a universal mobile telecommunications system (UMTS)-long term evolution (LTE) resource convergence scenario that has a base station as an anchor point, and including:

sending, by an access network node of an LTE system, a UMTS key derivation instruction message to a UMTS control node, where the UMTS key derivation instruction message carries a random number generated by the access network node, so that the UMTS control node generates, according to an internet protocol security key and the random number, a UMTS integrity key and cipher key; and deriving, by the access network node of the LTE system, according to the internet protocol security key and the random number, a UMTS integrity key and cipher key.

An embodiment of the present invention further provides a method for key generation, applied to a universal mobile telecommunications system (UMTS)-long term evolution (LTE) resource convergence scenario that has a base station as an anchor point, and including:

receiving, by a user equipment, a UMTS key derivation instruction message; and deriving, by the user equipment, according to a count value and a root key to an LTE system, or according to an LTE system root key and a random number carried in the UMTS key derivation instruction message, a UMTS integrity key and cipher key.

An embodiment of the present invention further provides a message sending method, applied to a universal mobile telecommunications system (UMTS)-long term evolution (LTE) resource convergence scenario that has a base station as an anchor point, and including:

receiving, by a UMTS control node, a UMTS integrity key and cipher key as well as a user equipment security capability from an access network node of an LTE system; and sending, by the UMTS control node, through the access network node of the LTE system, a security mode command message under integrity protection to a user equipment, where the security mode command message carries: an integrity algorithm and a cipher algorithm that are selected by the control node according to the user equipment security capability, the user equipment security capability and a parameter value generated by the control node, and an integrity message authentication code generated by the control node according to the UMTS integrity key, the parameter values generated by the control node, an integrity sequence number, the security mode command message, and a direction indication.

An embodiment of the present invention further provides a core network node, applied to a universal mobile telecommunications system (UMTS)-long term evolution (LTE) resource convergence scenario that has a base station as an anchor point, and including:

- a first generation module, configured to derive, according to a non-access stratum root key to an LTE system and a current non-access stratum count value of the LTE system, or according to a non-access stratum root key to an LTE system and a random number generated by the core network node, a UMTS integrity key and cipher key; and
- a first sending module, configured to send the UMTS integrity key and cipher key derived by the first generation module to a control node of a UMTS, so that the UMTS control node implements cipher and integrity protection by using the UMTS integrity key and cipher key.

An embodiment of the present invention further provides an access network node, applied to a universal mobile telecommunications system (UMTS)-long term evolution (LTE) resource convergence scenario that has a base station as an anchor point, and including:

- a second generation module, configured to derive, according to an access layer root key to an LTE system and a packet data convergence protocol count value of the LTE system, or according to an access layer root key to an LTE system and a random number generated by the access network node, a UMTS integrity key and cipher key; and
- a second sending module, configured to send the UMTS integrity key and cipher key derived by the second generation module to a control node of a UMTS, so that the control node of the UMTS implements cipher and integrity protection by using the UMTS integrity key and cipher key.

An embodiment of the present invention further provides an access network node, applied to a universal mobile telecommunications system (UMTS)-long term evolution (LTE) resource convergence scenario that has a base station as an anchor point, and including:

- a third sending module, configured to send a UMTS key derivation instruction message to a control node of a UMTS, where the UMTS key derivation instruction message carries a random number generated by the access network node, so that the control node of the UMTS derives, according to an internet protocol security key and the random number, a UMTS integrity key and cipher key; and
- a third generation module, configured to derive, according to the internet protocol security key and the random number, a UMTS integrity key and cipher key.

An embodiment of the present invention further provides a user equipment, applied to a universal mobile telecommunications system (UMTS)-long term evolution (LTE) resource convergence scenario that has a base station as an anchor point, and including:

- a fourth receiving module, configured to receive a UMTS key derivation instruction message; and
- a fourth generation module, configured to derive, according to a count value and a root key to an LTE system, or according to an LTE system root key and a random number carried in the UMTS key derivation instruction message, a UMTS integrity key and cipher key.

An embodiment of the present invention further provides a control node, applied to a universal mobile telecommunications system (UMTS)-long term evolution (LTE) resource convergence scenario that has a base station as an anchor point, and including:

- a fifth receiving module, configured to receive a UMTS integrity key and cipher key as well as a user equipment security capability from an access network node on an LTE system; and
- a fourth sending module, configured to send, through the access network node on the LTE system, a security mode command message under integrity protection to a user equipment, where the security mode command message carries: an integrity algorithm and a cipher algorithm that are selected by the control node according to the user equipment security capability, the user equipment security capability and parameter values generated by the control node, and an integrity message authentication code generated by the control node according to the UMTS integrity key, the parameter values generated by the control node, an integrity sequence number, the security mode command message, and a direction indication.

The embodiments of the present invention may derive, according to a root key and a count value of an LTE system, or according to a random number and an LTE system root key, a UMTS integrity key and cipher key; or derive, according to an internet protocol security key and a random number generated by an access network node of an LTE system, a UMTS integrity key and cipher key, thereby implementing the derivation of the UMTS integrity key and cipher key in a UL Boosting scenario that has an eNB as an anchor point, enabling a user equipment to communicate securely through a UMTS, and further improving security of data transmitted in the UMTS.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

Figure 1:
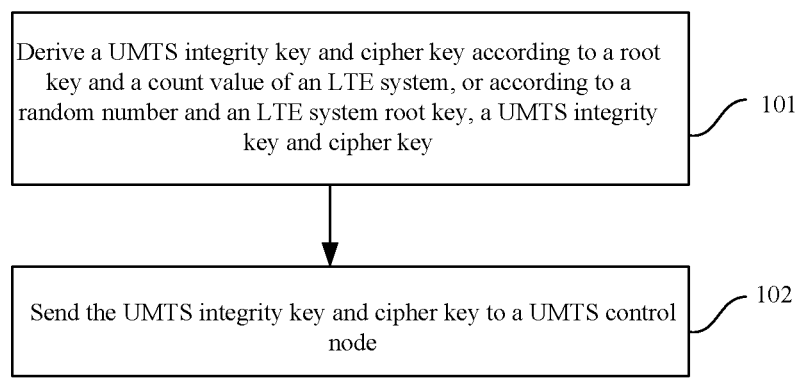
FIG. 1 is a flowchart of a method for key generation according to Embodiment 1 of the present invention.

FIG. 1 is a flowchart of a method for key generation according to Embodiment 1 of the present invention. The method for key generation that is provided in this embodiment may be applied to a UL Boosting scenario.

As shown in FIG. 1, the method for key generation may include:

Step 101: derive, according to a root key and a count value of an LTE system, or according to a random number and an LTE system root key, a UMTS integrity key and cipher key.

Step 102: Send the UMTS integrity key and cipher key to a UMTS control node, so that the UMTS control node implements cipher and integrity protection by using the UMTS integrity key and cipher key.

In an implementation manner of this embodiment, the LTE system root key may be a non-access stratum root key to the LTE system, and the count value of the LTE system may be a current non-access stratum count value of the LTE system. A core network node may receive a UMTS key derivation instruction message from an access network node of the LTE system before deriving the UMTS integrity key and cipher key according to the root key and the count value of the LTE system, or according to the random number and the LTE system root key. The deriving a UMTS integrity key and cipher key according to a root key and a count value of an LTE system, or according to a random number and an LTE system root key may be implemented as follows: The core network node derives, according to the current non-access stratum count value of the LTE system and the non-access stratum root key to the LTE system, or according to the non-access stratum root key to the LTE system and a random number generated by the core network node of the LTE system, a UMTS integrity key and cipher key.

In this implementation manner, the core network node may send the UMTS key derivation instruction message to a user equipment after the core network node receives the UMTS key derivation instruction message from the access network node of the LTE system, so that the user equipment derives, according to the current non-access stratum count value of the LTE system and the non-access stratum root key to the LTE system, or according to the non-access stratum root key to the LTE system and a random number carried in the UMTS key derivation instruction message, a UMTS integrity key and cipher key.

In addition, in this implementation manner, the core network node may also send, through a non-access stratum message, the UMTS integrity key and cipher key to the user equipment after the core network node derives, according to the current non-access stratum count value of the LTE system and the non-access stratum root key to the LTE system, or according to the non-access stratum root key to the LTE system and the random number generated by the core network node of the LTE system, the UMTS integrity key and cipher key, so that the user equipment stores the UMTS integrity key and cipher key.

In this implementation manner, the sending the UMTS integrity key and cipher key to a UMTS control node may be implemented as follows: The core network node sends the UMTS integrity key and cipher key to the access network node of the LTE system, so that the access network node of the LTE system may send the UMTS integrity key and cipher key to the UMTS control node, and the UMTS control node stores the UMTS integrity key and cipher key.

In this implementation manner, when a lifecycle of the UMTS key reaches a preset threshold, the core network node may rederive, according to the current non-access stratum count value of the LTE system and the non-access stratum root key to the LTE system, a UMTS integrity key and cipher key after the core network node receives a UMTS key update request message from the user equipment; or, when a lifecycle of the UMTS key reaches a preset threshold, the core network node may generate a new random number after the core network node receives a UMTS key update request message from the user equipment, and rederive, according to the new random number and the non-access stratum root key to the LTE system, a UMTS integrity key and cipher key; or, when a lifecycle of the UMTS key reaches a preset threshold, a UMTS integrity key and cipher key may be rederived through a re-authentication and key agreement procedure after receiving a notification from the user equipment.

In another implementation manner of this embodiment, the LTE system root key may be an access layer root key to the LTE system, and the count value of the LTE system may be a packet data convergence protocol count value of the LTE system. The deriving, according to a root key and a count value of an LTE system, or according to a random number and an LTE system root key, a UMTS integrity key and cipher key may be implemented as follows: An access network node of the LTE system derives, according to the access layer root key to the LTE system and the packet data convergence protocol count value of the LTE system, or according to the access layer root key to the LTE system and a random number generated by the access network node, a UMTS integrity key and cipher key.

In this implementation manner, the access network node of the LTE system may send a UMTS key derivation instruction message to a user equipment before deriving the UMTS integrity key and cipher key according to the root key and the count value of the LTE system, or according to the random number and the LTE system root key, so that the user equipment may derive, according to the access layer root key to the LTE system and the packet data convergence protocol count value of the LTE system, or according to the access layer root key to the LTE system and a random number generated by the access network node and carried in the UMTS key derivation instruction message, a UMTS integrity key and cipher key.

In this implementation manner, the access network node of the LTE system may also send, through an access layer message under cipher and integrity protection, the UMTS integrity key and cipher key to a user equipment after the access network node of the LTE system derives, according to the access layer root key to the LTE system and the packet data convergence protocol count value of the LTE system, or according to the access layer root key to the LTE system and the random number generated by the access network node of the LTE system, the UMTS integrity key and cipher key, so that the user equipment stores the UMTS integrity key and cipher key.

In this implementation manner, the sending the UMTS integrity key and cipher key to a UMTS control node may be implemented as follows: The access network node of the LTE system sends the UMTS integrity key and cipher key to the UMTS control node, so that the UMTS control node stores the UMTS integrity key and cipher key.

In this implementation manner, when the packet data convergence protocol count value of the LTE system overflows or the user equipment state changes from an idle state to a connected state, the access network node of the LTE system may derive, according to the packet data convergence protocol count value of the LTE system and an access layer root key updated by the access network node, or according to an access layer root key updated by the access network node and a random number newly generated by the access network node, a UMTS integrity key and cipher key; or, when a lifecycle of the UMTS key reaches a preset threshold, the access network node of the LTE system may regenerate a new random number after the access network node of the LTE system receives a UMTS key update request message from the user equipment, and rederiving, according to the new random number and the access layer root key, a UMTS integrity key and cipher key; or, when a lifecycle of the UMTS key reaches a preset threshold, a UMTS integrity key and cipher key may rederived through a re-authentication and key agreement procedure after receiving a notification from the user equipment.

In the foregoing two implementation manners of this embodiment, the UMTS control node may receive the UMTS integrity key and cipher key as well as a user equipment security capability, then the UMTS control node may send a security mode command message under integrity protection to the user equipment, wherein the security mode command message carries: an integrity algorithm and a cipher algorithm that are selected by the control node according to the user equipment security capability, the user equipment security capability and parameter values generated by the control node, and an integrity message authentication code generated by the control node according to the UMTS integrity key, the parameter values generated by the control node, an integrity sequence number, the security mode command message, and a direction indication.

Then, the control node may receive a security mode command complete message under integrity protection from the user equipment, where the user equipment sends the security mode command complete message to the control node in the following scenario:

After the user equipment receives the security mode command message, the user equipment generates an integrity message authentication code according to a user equipment integrity key to UMTS, the integrity sequence number, the direction indication, the security mode command message, and parameter values carried in the security mode command message; additionally, the user equipment determines that the integrity message authentication code generated by the user equipment is consistent with an integrity message authentication code carried in the security mode command message and the user equipment security capability carried in the security mode command message is consistent with a security capability of the user equipment itself.

In addition, the UMTS control node may receive the UMTS integrity key and cipher key as well as the a user equipment security capability, then the UMTS control node may send, through the access network node of the LTE system, a security mode command message under integrity protection to the user equipment, where the security mode command message carries: an integrity algorithm and a cipher algorithm that are selected by the control node according to the user equipment security capability, the user equipment security capability and parameter values generated by the control node, and an integrity message authentication code generated by the control node according to the UMTS integrity key, the parameter values generated by the control node, an integrity sequence number, the security mode command message, and a direction indication.

Then, the control node may receive a security mode command complete message under integrity protection that is sent, through the access network node of the LTE system, from the user equipment, where the user equipment sends the security mode command complete message to the UMTS control node through the access network node of the LTE system in the following scenario: After the user equipment receives the security mode command message, the user equipment generates an integrity message authentication code according to a user equipment integrity key to UMTS, the integrity sequence number, the direction indication, the security mode command message, and parameter values carried in the security mode command message; additionally, the user equipment determines that the integrity message authentication code generated by the user equipment is consistent with an integrity message authentication code carried in the security mode command message and the user equipment security capability carried in the security mode command message is consistent with a security capability of the user equipment itself.

In this embodiment, a core network node or an access network node may derive, according to a root key and a count value of an LTE system, or according to a random number and an LTE system root key, a UMTS integrity key and cipher key, thereby enabling the derivation of the UMTS integrity key and cipher key in a UL Boosting scenario that has an eNB as an anchor point, enabling a user equipment to communicate securely through a UMTS, and further improving security of data transmitted in the UMTS.

The access network node in the embodiment of the present invention may be a node that has an access function, such as a base station. The base station may include an eNB. The eNB may be a common macro base station or a small base station, including a home base station (Home enhanced NodeB, hereinafter briefly referred to as HeNB/Home NodeB, hereinafter briefly referred to as HNB), or a relay node (Relay Node, hereinafter briefly referred to as RN). The core network node may be a node that provides a function of a core network, such as a mobility management entity (Mobility Management Entity, hereinafter briefly referred to as MME). The UMTS control node may be an entity that has the control function, such as an RNC. However, the embodiment of the present invention does not define a specific form of the access network node, UMTS control node, or core network node.

In the following embodiments of the present invention, the case where the access network node of the LTE system is an eNB, the core network node is an MME, and the UMTS control node is an RNC is taken as an example for description. Methods provided in the following embodiments of the present invention all apply to a UL Boosting scenario.

Figure 2:
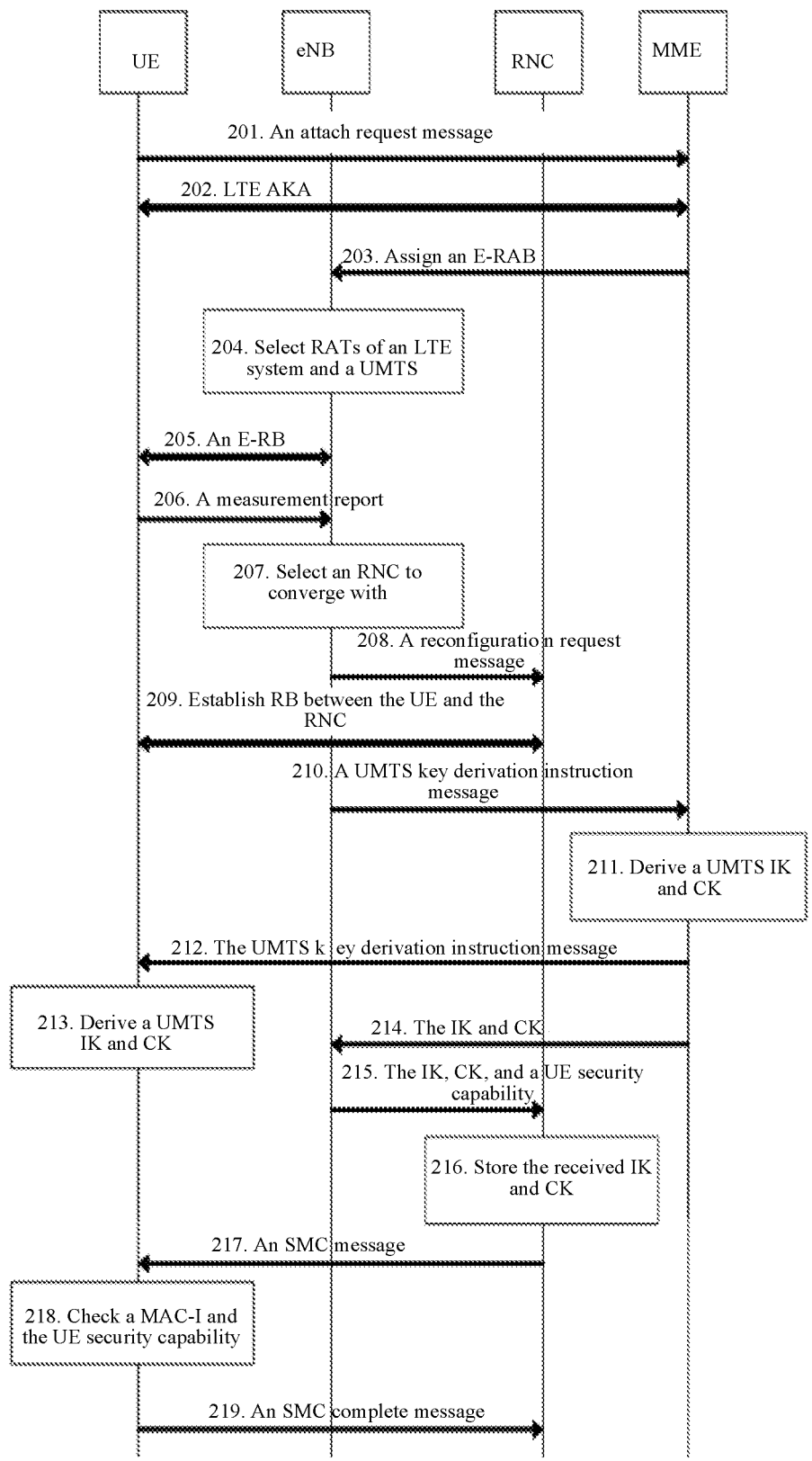
FIG. 2 is a flowchart of a method for key generation according to Embodiment 2 of the present invention.

FIG. 2 is a flowchart of a method for key generation according to Embodiment 2 of the present invention. As shown in FIG. 2, the method for key generation may include:

Step 201: A UE sends an attach request message to an MME, requesting to access an LTE network.

Step 202: The UE and the MME perform an LTE AKA procedure to complete bi-directional authentication between the UE and the MME and generate keys to an LTE system.

The keys to the LTE system may include a non-access stratum (Non Access Stratum, hereinafter briefly referred to as NAS) root key to the LTE system and the NAS root key is stored on the UE and MME.

Step 203: The MME assigns an evolved universal terrestrial radio access network radio access bearer (Evolved Universal Terrestrial Radio Access Network Radio Access Bearer, hereinafter briefly referred to as E-RAB) to an eNB after the authentication between the UE and the MME is successful.

Step 204: The eNB selects radio access technologies (Radio Access Technology, hereinafter briefly referred to as RAT) of the LTE system and a UMTS according to the assigned E-RAB.

Step 205: Establish an evolved universal terrestrial radio access network radio bearer (Evolved Universal Terrestrial Radio Access Network Radio Bearer, hereinafter briefly referred to as E-RB) between the UE and the eNB.

Step 206: The UE measures a UMTS cell that may be cooperate with, obtains a measurement report, and sends the measurement report to the eNB.

Step 207: The eNB selects an RNC to converge with according to a measurement result of the UMTS cell that is reported by the UE.

Step 208: The eNB sends a reconfiguration request message to the RNC.

Step 209: Establish a radio bearer (Radio Bearer, hereinafter briefly referred to as RB) between the UE and the RNC.

Step 210: The eNB sends a UMTS key derivation instruction message to the MME.

Step 211: The MME derives a UMTS integrity key (Integrity Key, hereinafter briefly referred to as IK) and cipher key (Cipher Key, hereinafter briefly referred to as CK) after receiving the UMTS key derivation instruction message. The following two methods may be adopted specifically:
(a) deriving, according to an NAS root key (Kasme) and a current non-access stratum count value (Non Access Stratum Count+1, hereinafter briefly referred to as NAS Count+1) of the LTE system, the UMTS IK and CK, that is, IK∥CK=KDF (Kasme, NAS Count+1), where KDF is short for key derivation function (Key Derivation Function); or,
(b) the MME generating a random number (Nonce), and deriving, according to a Kasme and the Nonce, the UMTS IK and CK, that is, IK∥CK=KDF (Kasme, Nonce); and then in step 212, the MME sends the Nonce value to the UE through the UMTS key derivation instruction message.

In addition, in step 211 of this embodiment, the MME performs no processing after receiving the UMTS key derivation instruction message from the eNB.

Step 212: The MME sends the UMTS key derivation instruction message to the UE.

Specifically, if the MME performs no processing in step 211, the MME further needs to locally derive a UMTS IK and CK after sending the UMTS key derivation instruction message to the UE, that is, IK∥CK=KDF (Kasme, NAS Count).

Step 213: The UE derives a UMTS CK and IK after receiving the UMTS key derivation instruction message. The following two methods may be adopted specifically:
(a) deriving, according to the Kasme and the current non-access stratum count value (NAS Count) of the LTE system, the UMTS IK and CK, that is, IK∥CK=KDF (Kasme, NAS Count); or,
(b) the UE deriving, according to the Kasme and Nonce, the UMTS IK and CK, that is, IK∥CK=KDF (Kasme, Nonce).

It should be noted that, if the non-access stratum count value that the MME uses to derive the UMTS key in step 211 is (NAS Count+1), the UE needs to use a non-access stratum count value (NAS Count) to derive the UMTS key in step 213. This ensures that the MME and the UE use the same non-access stratum count value to derive the UMTS key, and the UMTS key derived by the MME and that derived by the UE are consistent.

Step 214: The MME sends the derived IK and CK to the eNB.

Step 215: The eNB sends the IK, CK, and a UE security capability (UE security capability) to the RNC.

Step 216: The RNC stores the received IK and CK.

Step 217: The RNC sends a security mode command (Security Mode Command, hereinafter briefly referred to as SMC) message to the UE, where the SMC message carries: a cipher and integrity algorithm that are selected by the RNC according to the UE security capability, a parameter value (Fresh) generated by the RNC and the UE security capability, and an integrity message authentication code (Message Authentication Code for Integrity, hereinafter briefly referred to as MAC-I) generated according to the IK, an integrity sequence number, the SMC message, a direction indication (direction), and the Fresh through an F9 algorithm, and the SMC message is under integrity protection.

Step 218: The UE checks the MAC-I and UE security capability after receiving the SMC message.

Specifically, the UE may generate an integrity message authentication code (X Message Authentication Code for Integrity, hereinafter briefly referred to as XMAC-I) according to the IK of the UE, the integrity sequence number, the direction indication, the SMC message, and a parameter value (Fresh) carried in the SMC message through the F9 algorithm after receiving the SMC message. Then the UE checks whether the XMAC-I is the same as a MAC-I carried in the SMC message to determine whether the SMC message is complete. If the XMAC-I is the same as the MAC-I carried in the SMC message, the UE may determine that the SMC message is complete. In addition, the UE further checks whether a UE security capability carried in the SMC message is consistent with a security capability of the UE itself.

The UE performs an operation provided in step 219 after it determines that the SMC message is complete and the UE security capability carried in the SMC message is consistent with the security capability of the UE itself. If the UE determines that the SMC message is incomplete or the UE security capability carried in the SMC message is inconsistent with the security capability of the UE itself, the UE terminates this procedure.

Step 219: The UE sends an SMC complete message under integrity protection to the MME.

In this embodiment, the UMTS key need to be updated in the following scenarios:
(1) when a lifecycle (START) of the UMTS key reaches a preset threshold, the UE notifies a network side of performing a new AKA procedure to rederive a UMTS IK and CK;
(2) when a lifecycle (START) of the UMTS key reaches a preset threshold, the UE sends a UMTS key update request message to the MME. The MME derives, according to the current non-access stratum count value (NAS Count/(NAS Count+1)) and Kasme to the LTE system after receiving the UMTS key update request message, a new UMTS IK and CK; or,
(3) when a lifecycle (START) of the UMTS key reaches a preset threshold, the UE sends a UMTS key update request message to the MME. The MME generates a new random number Nonce after receiving the UMTS key update request message, and rederives, according to the new Nonce and the Kasme, a new UMTS IK and CK.

In this embodiment, an MME and a UE may derive, according to a current non-access stratum count value of an LTE system and a non-access stratum root key (Kasme) to the LTE system, or according to a non-access stratum root key (Kasme) to an LTE system and a random number generated by the MME, a UMTS IK and CK, thereby enabling the derivation of the UMTS integrity key and cipher key in a UL Boosting scenario that has an eNB as an anchor point, enabling the UE to communicate securely through a UMTS, and further improving security of data transmitted in the UMTS.

Figure 3:
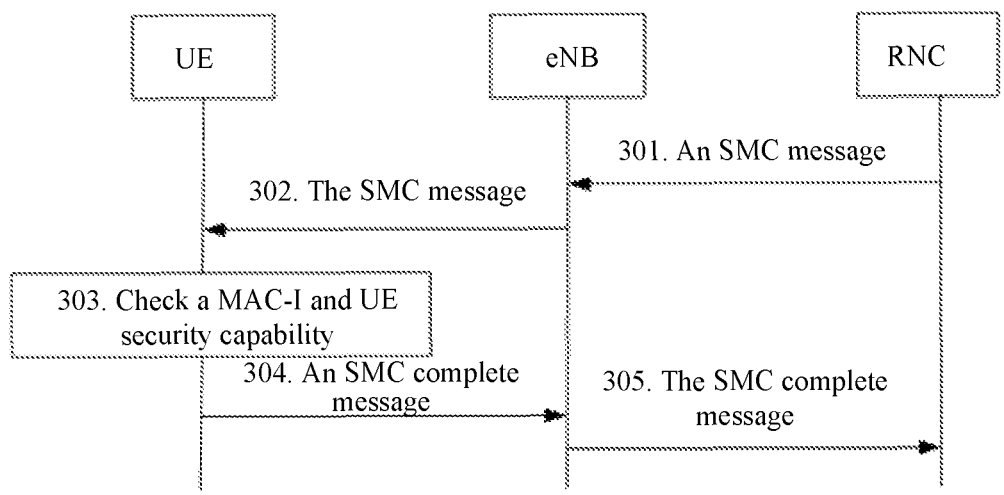
FIG. 3 is a flowchart of a message sending method according to Embodiment 1 of the present invention.

In the embodiment of the present invention shown in FIG. 2, the LTE system and UMTS have their own signaling radio bearers (Signaling Radio Bearer, hereinafter briefly referred to as SRB). When the LTE system and UMTS share an SRB, the procedure for sending an SMC message may be shown in FIG. 3. FIG. 3 is a flowchart of a message sending method according to Embodiment 1 of the present invention. As shown in FIG. 3, the message sending method may include:

Step 301: An RNC sends an SMC message to an eNB, where the SMC message carries: a cipher algorithm and an integrity algorithm that are selected by the RNC according to a UE security capability, a parameter value (Fresh) generated by the RNC and the UE security capability, and a MAC-I generated according to an IK, an integrity sequence number, the SMC message, a direction indication, and the Fresh, and the SMC message through an F9 algorithm is under integrity protection.

Step 302: The eNB sends the SMC message to a UE, where the SMC message carries: the cipher algorithm and integrity algorithm that are selected by the RNC according to the UE security capability, the parameter value (Fresh) generated by the RNC and the UE security capability, and the MAC-I generated according to the IK, the integrity sequence number, the SMC message, the direction indication, and the Fresh through the F9 algorithm.

Step 303: The UE checks the MAC-I and the UE security capability.

Specifically, the UE may generate an XMAC-I according to the IK of the UE, the integrity sequence number, the direction indication, the SMC message, and a parameter value (Fresh) carried in the SMC message through the F9 algorithm after receiving the SMC message. Then the UE checks whether the XMAC-I is the same as a MAC-I carried in the SMC message to determine whether the SMC message is complete. If the XMAC-I is the same as the MAC-I carried in the SMC message, the UE may determine that the SMC message is complete. In addition, the UE further checks whether the UE security capability carried in the SMC message is consistent with a security capability of the UE itself.

The UE performs operations provided in step 304 and subsequent steps after it determines that the SMC message is complete and the UE security capability carried in the SMC message is consistent with the security capability of the UE itself. If the UE determines that the SMC message is incomplete or the UE security capability carried in the SMC message is inconsistent with the security capability of the UE itself, the UE terminates this procedure.

Step 304: The UE sends an SMC complete message under integrity protection to the eNB.

Step 305: The eNB sends the SMC complete message under integrity protection to the RNC.

In this embodiment, an RNC sends an SMC message to a UE through an eNB and receives an SMC complete message from the UE through the eNB. In this case, the RNC and the UE can perform an SMC procedure to negotiate a cipher algorithm and an integrity algorithm when an LTE system and a UMTS share an SRB.

Figure 4:
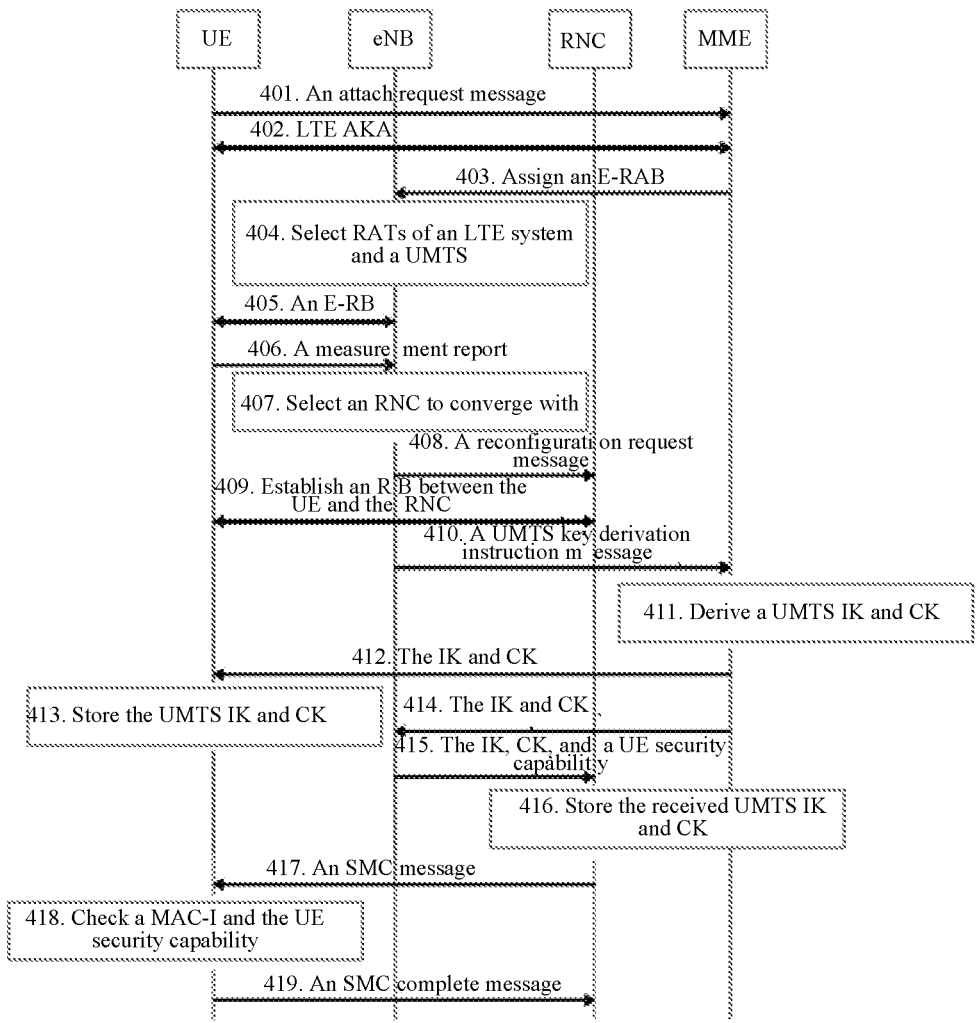
FIG. 4 is a flowchart of a method for key generation according to Embodiment 3 of the present invention.

FIG. 4 is a flowchart of a method for key generation according to Embodiment 3 of the present invention. In this embodiment, an MME directly sends, through an NAS message, a deriveed UMTS IK and CK to a UE and the UE does not need to derive a UMTS key.

As shown in FIG. 4, the method for key generation may include:

Step 401: A UE sends an attach request message to an MME, requesting to access an LTE network.

Step 402: The UE and the MME perform an LTE AKA procedure to complete bi-directional authentication between the UE and the MME and derive keys to an LTE system.

The keys to the LTE system may include an NAS root key to the LTE system and the NAS root key is stored on the UE and MME.

Step 403: The MME assigns an E-RAB to an eNB after the authentication between the UE and the MME is successful.

Step 404: The eNB selects RATs of the LTE system and a UMTS according to the assigned E-RAB.

Step 405: Establish an E-RB between the UE and the eNB.

Step 406: The UE measures a UMTS cell that may be cooperated with, obtains a measurement report, and sends the measurement report to the eNB.

Step 407: The eNB selects an RNC to converge with according to a measurement result of the UMTS cell that is reported by the UE.

Step 408: The eNB sends a reconfiguration request message to the RNC.

Step 409: Establish an RB between the UE and the RNC.

Step 410: The eNB sends a UMTS key derivation instruction message to the MME.

Step 411: The MME derives a UMTS IK and CK after receiving the UMTS key derivation instruction message. The following two methods may be adopted specifically:
(a) deriving, according to an NAS root key (Kasme) and a current non-access stratum count value (NAS Count), the UMTS IK and CK, that is, IK∥CK=KDF (Kasme, NAS Count); or, (b) the MME generating a random number (Nonce), and generating, according to a Kasme and the Nonce, the UMTS IK and CK, that is, IK∥CK=KDF (Kasme, Nonce).

Step 412: The MME sends, through an NAS message under cipher and integrity protection, the UMTS IK and CK to the UE.

Step 413: The UE stores the UMTS IK and CK after receiving the NAS message.

Step 414: The MME sends the derived UMTS IK and CK to the eNB.

Step 415: The eNB sends the UMTS IK and CK, and a UE security capability to the RNC.

Step 416: The RNC stores the received UMTS IK and CK.

Step 417: The RNC sends an SMC message to the UE, where the SMC message carries: a cipher algorithm and an integrity algorithm that are selected by the RNC, a parameter value (Fresh) generated by the RNC and the UE security capability, and a MAC-I generated according to the IK, an integrity sequence number, the SMC message, a direction indication, and the Fresh, and the SMC message through an F9 algorithm is under integrity protection.

Step 418: The UE checks the MAC-I and UE security capability after receiving the SMC message.

Specifically, the UE may generate an XMAC-I according to the IK of the UE, the integrity sequence number, the direction indication, the SMC message, and a parameter value (Fresh) carried in the SMC message through the F9 algorithm after receiving the SMC message. Then the UE checks whether the XMAC-I is the same as a MAC-I carried in the SMC message to determine whether the SMC message is complete. If the XMAC-I is the same as the MAC-I carried in the SMC message, the UE may determine that the SMC message is complete. In addition, the UE further checks whether a UE security capability carried in the SMC message is consistent with a security capability of the UE itself.

The UE performs an operation provided in step 419 after it determines that the SMC message is complete and the UE security capability carried in the SMC message is consistent with the security capability of the UE itself. If the UE determines that the SMC message is incomplete or the UE security capability carried in the SMC message is inconsistent with the security capability of the UE itself, the UE terminates this procedure.

Step 419: The UE sends an SMC complete message under integrity protection to the MME.

In this embodiment, the UMTS key need to be updated in the following scenarios:

(1) when a lifecycle (START) of the UMTS key reaches a preset threshold, the UE notifies a network side of performing a new AKA procedure to rederive a UMTS IK and CK;

(2) when a lifecycle of the UMTS key reaches a preset threshold, the UE sends a UMTS key update request message to the MME. The MME derives, according to the current non-access stratum count value (NAS Count) and Kasme to the LTE system after receiving the UMTS key update request message, a new UMTS IK and CK; or, (3) when a lifecycle of the UMTS key reaches a preset threshold, the UE sends a UMTS key update request message to the MME. The MME generates a new random number Nonce after receiving the UMTS key update request message, and rederives, according to the new Nonce and the Kasme, a new UMTS IK and CK.

In the embodiment of the present invention shown in FIG. 4, the LTE system and UMTS have their own SRB. When the LTE system and UMTS share an SRB, the procedure for sending an SMC message may be shown in FIG. 3, and details are not described herein again.

In this embodiment, an MME may derive, according to a current non-access stratum count value of an LTE system and a non-access stratum root key (Kasme) to the LTE system, or according to a non-access stratum root key (Kasme) to an LTE system and a random number generated by the MME, a UMTS IK and CK. Then the MME may send the UMTS IK and CK to a UE, thereby enabling the derivation of the UMTS integrity key and cipher key in a UL Boosting scenario that has an eNB as an anchor point, enabling the UE to communicate securely through a UMTS, and further improving security of data transmitted in the UMTS.

Figure 5:
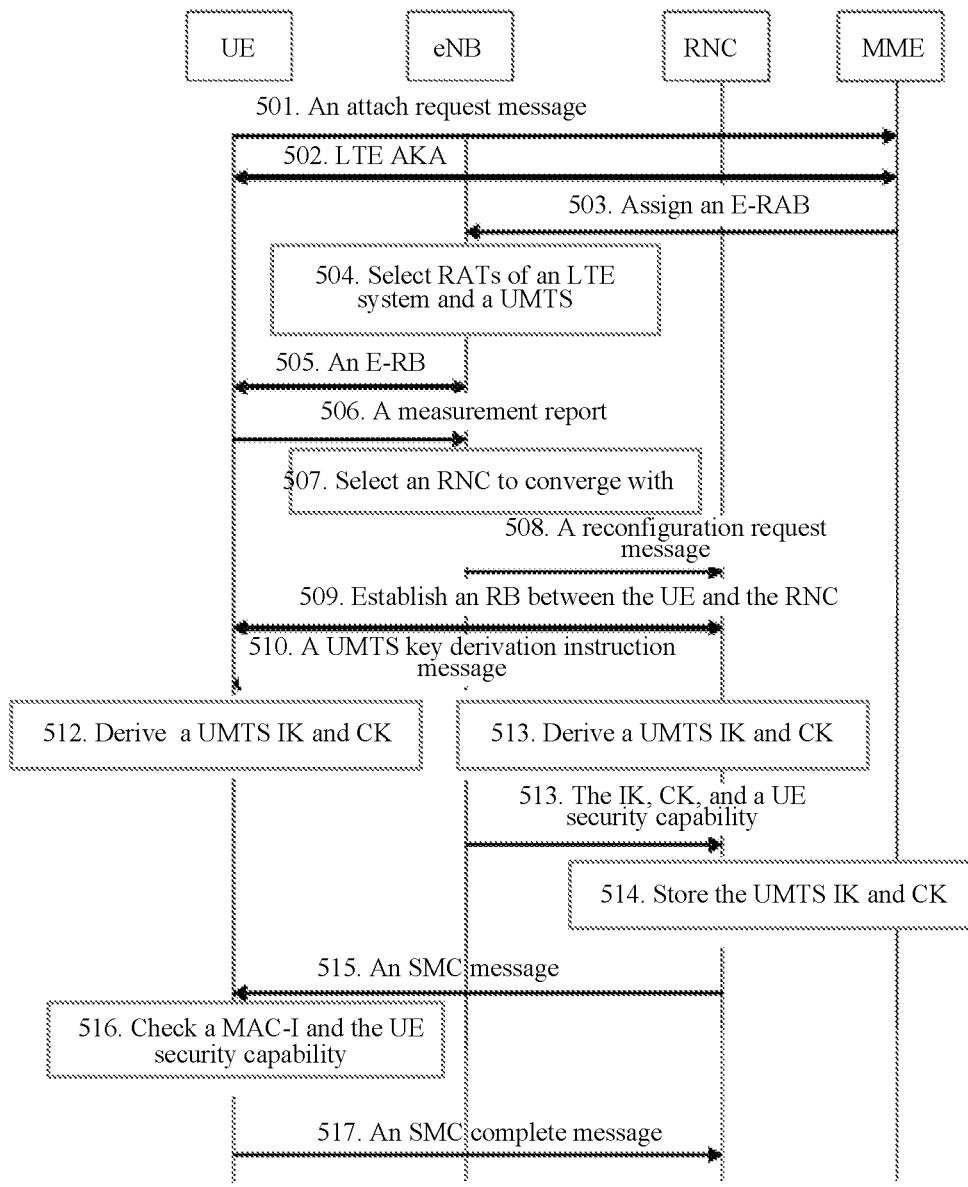
FIG. 5 is a flowchart of a method for key generation according to Embodiment 4 of the present invention.

FIG. 5 is a flowchart of a method for key generation according to Embodiment 4 of the present invention. As shown in FIG. 5, the method for key generation may include:

Step 501: A UE sends an attach request message to an MME, requesting to access an LTE network.

Step 502: The UE and the MME perform an LTE AKA procedure to complete bi-directional authentication between the UE and the MME and generate a key to an LTE system.

In this embodiment, the key to the LTE system may include an access layer root key to the LTE system.

Step 503: The MME assigns an E-RAB to an eNB after the authentication between the UE and the MME is successful.

Step 504: The eNB selects RATs of the LTE system and a UMTS according to the assigned E-RAB.

Step 505: Establish an E-RB between the UE and the eNB.

Step 506: The UE measures a UMTS cell that may be cooperated with, obtains a measurement report, and sends the measurement report to the eNB.

Step 507: The eNB selects an RNC to converge with according to a measurement result of the UMTS cell that is reported by the UE.

Step 508: The eNB sends a reconfiguration request message to the RNC.

Step 509: Establish an RB between the UE and the RNC.

Step 510: The eNB sends a UMTS key derivation instruction message to the UE for instructing the UE to generate a UMTS key.

Optionally, the eNB may send a Nonce value generated by the eNB to the UE through the UMTS key derivation instruction message.

Step 511: The eNB derives a UMTS IK and CK. The following two methods may be adopted specifically:

(a) deriving, according to an access layer root key ($K_{eNB}$) and a PDCP count value (PDCP Count) of the LTE system, the UMTS IK and CK, that is, IK∥CK=KDF ($K_{eNB}$, PDCP Count); or, (b) the eNB generating a Nonce value, and generating, according to a $K_{eNB}$ and the Nonce value, the UMTS IK and CK, that is, IK∥CK=KDF ($K_{eNB}$, Nonce).

Step 512: The UE derives a UMTS IK and CK after receiving the UMTS key derivation instruction message. The following two methods may be adopted specifically:

(a) deriving, according to the $K_{eNB}$ and the PDCP Count value, the UMTS IK and CK, that is, IK∥CK=KDF ($K_{eNB}$, PDCP Count); or, (b) deriving, according to the $K_{eNB}$ and the Nonce value, the UMTS IK and CK, that is, IKI∥K=KDF ($K_{eNB}$, Nonce).

Step 513: The eNB sends the derived UMTS IK and CK, and a UE security capability to the RNC.

Step 514: The RNC stores the UMTS IK and CK.

Step 515: The RNC sends an SMC message to the UE, where the SMC message carries: a cipher algorithm and an integrity algorithm that are selected by the RNC according to the UE security capability, a parameter value (Fresh) generated by the RNC and the UE security capability, and a MAC-I generated according to the IK, an integrity sequence number, the SMC message, a direction indication, and the Fresh, and the SMC message through an F9 algorithm is under integrity protection.

Step 516: The UE checks the MAC-I and UE security capability after receiving the SMC message.

Specifically, the UE may generate an XMAC-I according to the IK of the UE, the integrity sequence number, the direction indication, the SMC message, and a parameter value (Fresh) carried in the SMC message through the F9 algorithm after receiving the SMC message. Then the UE checks whether the XMAC-I is the same as a MAC-I carried in the SMC message to determine whether the SMC message is complete. If the XMAC-I is the same as the MAC-I carried in the SMC message, the UE may determine that the SMC message is complete. In addition, the UE further checks whether a UE security capability carried in the SMC message is consistent with a security capability of the UE itself.

The UE performs an operation provided in step 517 after it determines that the SMC message is complete and the UE security capability carried in the SMC message is consistent with the security capability of the UE itself. If the UE determines that the SMC message is incomplete or the UE security capability carried in the SMC message is inconsistent with the security capability of the UE itself, the UE terminates this procedure.

Step 517: The UE sends an SMC complete message under integrity protection to the RNC.

In this embodiment, the UMTS key need to be updated in the following scenarios:

(1) when a lifecycle (START) of the UMTS key reaches a preset threshold, the UE notifies a network side of performing a new AKA procedure to rederive a UMTS IK and CK;

(2) when the PDCP count value of the LTE system overflows, the $K_{eNB}$ needs to be updated, and the UMTS key also needs to be updated;

(3) when the UE state changes from an idle (idle) state to a connected (connected) state, the $K_{eNB}$ to the LTE system needs to be updated, and the UMTS key also needs to be updated; or, (4) when a lifecycle of the UMTS key reaches a preset threshold, the UE sends a UMTS key update request message to the eNB. The eNB generates a new Nonce value after receiving the UMTS key update request message, and regenerates, according to the new Nonce and the $K_{eNB}$, a new UMTS IK and CK.

In this embodiment, an eNB and a UE may derive, according to a PDCP count value and an access layer root key ($K_{eNB}$) to the LTE system, or according to an access layer root key ($K_{eNB}$) of the LTE system and a random number generated by the eNB, a UMTS IK and CK, thereby enabling the derivation of the UMTS integrity key and cipher key in a UL Boosting scenario that has an eNB as an anchor point, enabling the UE to communicate securely through a UMTS, and further improving security of data transmitted in the UMTS.

Figure 6:
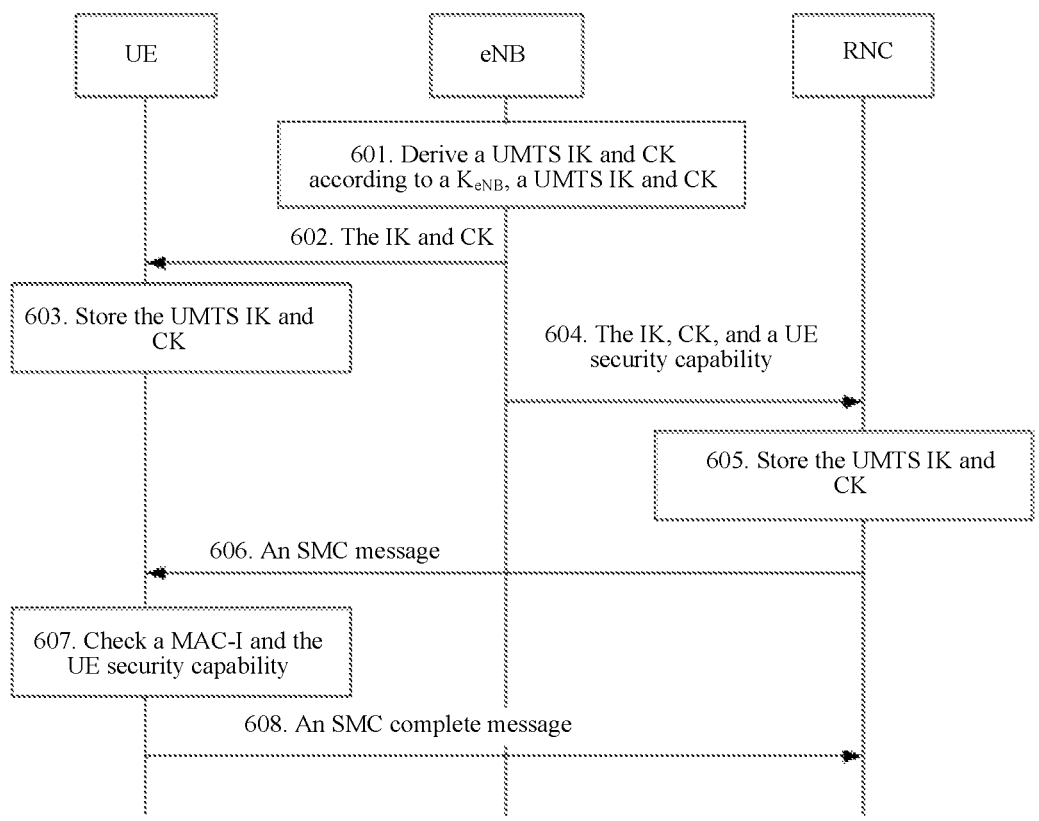
FIG. 6 is a flowchart of a method for key generation according to Embodiment 5 of the present invention.

In the embodiment of the present invention shown in FIG. 5, the eNB and the UE may respectively derive a UMTS IK and CK, or the eNB derives a UMTS IK and CK and sends, through an access layer (Access layer, hereinafter briefly referred to as AS) message, the UMTS IK and CK to the UE as shown in FIG. 6. FIG. 6 is a flowchart of a method for key generation according to Embodiment 5 of the present invention. The method for key generation may include:

Step 601: An eNB derives, according to an access layer root key ($K_{eNB}$) of an LTE system, a UMTS IK and CK.

Specifically, the eNB derives the UMTS IK and CK by using the following two methods:

(a) deriving, according to the $K_{eNB}$ and a PDCP count value (PDCP Count), the UMTS IK and CK, that is, IK||CK=KDF ($K_{eNB}$, PDCP Count); or, (b) the eNB generating a Nonce value, and deriving, according to the $K_{eNB}$ and the Nonce value, the UMTS IK and CK, that is, IK||CK=KDF ($K_{eNB}$, Nonce).

Step 602: The eNB sends, through an AS message under cipher and integrity protection, the derived UMTS IK and CK to a UE.

Step 603: The UE stores the UMTS IK and CK.

Step 604: The eNB sends the derived UMTS IK and CK, and a UE security capability to an RNC.

Step 605: The RNC stores the UMTS IK and CK.

In this embodiment, steps 602 and 603, and steps 604 and 605 may be performed in sequence or at the same time.

Steps 606 to 608 are the same as steps 515 to 517 and details are not described herein again.

In the embodiments of the present invention shown in FIG. 5 and FIG. 6, the LTE system and UMTS have their own SRB. When the LTE system and UMTS share an SRB, the procedure for sending an SMC message may be shown in FIG. 3, and details are not described herein again.

In this embodiment, an eNB may derive, according to a PDCP count value and an access layer root key ($K_{eNB}$) to an LTE system, or according to an access layer root key ($K_{eNB}$) to an LTE system and a random number generated by the eNB, a UMTS IK and CK. Then the eNB may send the UMTS IK and CK to a UE, thereby enabling the derivation of the UMTS integrity key and cipher key in a UL Boosting scenario that has an eNB as an anchor point, enabling the UE to communicate securely through a UMTS, and further improving security of data transmitted in the UMTS.

Figure 7:
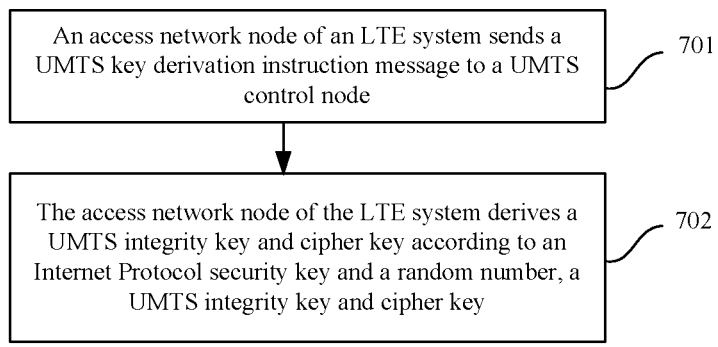
FIG. 7 is a flowchart of a method for key generation according to Embodiment 6 of the present invention.

FIG. 7 is a flowchart of a method for key generation according to Embodiment 6 of the present invention. As shown in FIG. 7, the method for key generation may include:

Step 701: An access network node of an LTE system sends a UMTS key derivation instruction message to a UMTS control node, where the UMTS key derivation instruction message carries a random number generated by the access network node, so that the control node derives, according to an internet protocol security key and the random number, a UMTS integrity key and cipher key.

Step 702: The access network node of the LTE system derives, according to the internet protocol security key and the random number, a UMTS integrity key and cipher key.

In this embodiment, the access network node of the LTE system may further send, through an access layer message under cipher and integrity protection, the UMTS integrity key and cipher key to a user equipment after the access network node of the LTE system derives, according to the internet protocol security key and the random number, the UMTS integrity key and cipher key, so that the user equipment stores the UMTS integrity key and cipher key.

In this embodiment, the access network node of the LTE system and the UMTS control node may further perform a certificate-based authentication procedure to derive the internet protocol security key and the random number before the access network node sends the UMTS key derivation instruction message to the UMTS control node.

In this embodiment, when a lifecycle (START) of the UMTS key reaches a preset threshold, the access network node of the LTE system generates a new random number after the access network node of the LTE system receives a UMTS key update request message from a user equipment, and rederives, according to the new random number and the internet protocol security key, a UMTS integrity key and cipher key.

In addition, in this embodiment, the UMTS control node may send a security mode command message to the user equipment after the access network node of the LTE system sends, through the access layer message, the UMTS integrity key and cipher key to the user equipment, where the security mode command message carries: an integrity algorithm and a cipher algorithm that are selected by the control node according to a user equipment security capability, the user equipment security capability and parameter values generated by the control node, and an integrity message authentication code generated by the control node according to the UMTS integrity key, the parameter values generated by the control node, an integrity sequence number, the security mode command message, and a direction indication; and the security mode command message is under integrity protection.

Then, the control node may receive a security mode command complete message from the user equipment, where the user equipment sends the security mode command complete message to the control node in the following scenario: After the user equipment receives the security mode command message, the user equipment generates an integrity message authentication code according to a user equipment integrity key to UMTS, the integrity sequence number, the direction indication, the security mode command message, and parameter values carried in the security mode command message; additionally, the user equipment determines that the integrity message authentication code generated by the user equipment is consistent with an integrity message authentication code carried in the security mode command message and the user equipment security capability carried in the security mode command message is consistent with a security capability of the user equipment itself; and the security mode command complete message is under integrity protection.

In addition, in this embodiment, the UMTS control node may also send, through the access network node of the LTE system, the security mode command message to the user equipment after the access network node of the LTE system sends, through an access layer message, the UMTS integrity key and cipher key to the user equipment, where the security mode command message carries: an integrity algorithm and a cipher algorithm that are selected by the control node according to a user equipment security capability, the user equipment security capability and parameter values generated by the control node, and an integrity message authentication code generated by the control node according to the UMTS integrity key, the parameter values generated by the control node, an integrity sequence number, the security mode command message, and a direction indication; and the security mode command message is under integrity protection.

Then, the UMTS control node may receive a security mode command complete message sent, through the access network node of the LTE system, from the user equipment, where the user equipment sends the security mode command complete message to the control node through the access network node of the LTE system in the following scenario: After the user equipment receives the security mode command message, the user equipment generates an integrity message authentication code according to a user equipment integrity key to UMTS, the integrity sequence number, the direction indication, the security mode command message, and parameter values carried in the security mode command message; additionally, the user equipment determines that the integrity message authentication code generated by the user equipment is consistent with an integrity message authentication code carried in the security mode command message and the user equipment security capability carried in the security mode command message is consistent with a security capability of the user equipment itself; and the security mode command complete message is under integrity protection.

In this embodiment, an access network node of an LTE system can derive, according to an internet protocol security key and a random number generated by the access network node of the LTE system, a UMTS integrity key and cipher key, thereby enabling the derivation of the UMTS integrity key and cipher key in a UL Boosting scenario that has an eNB as an anchor point, enabling a user equipment to communicate securely through a UMTS, and further improving security of data transmitted in the UMTS.

Figure 8:
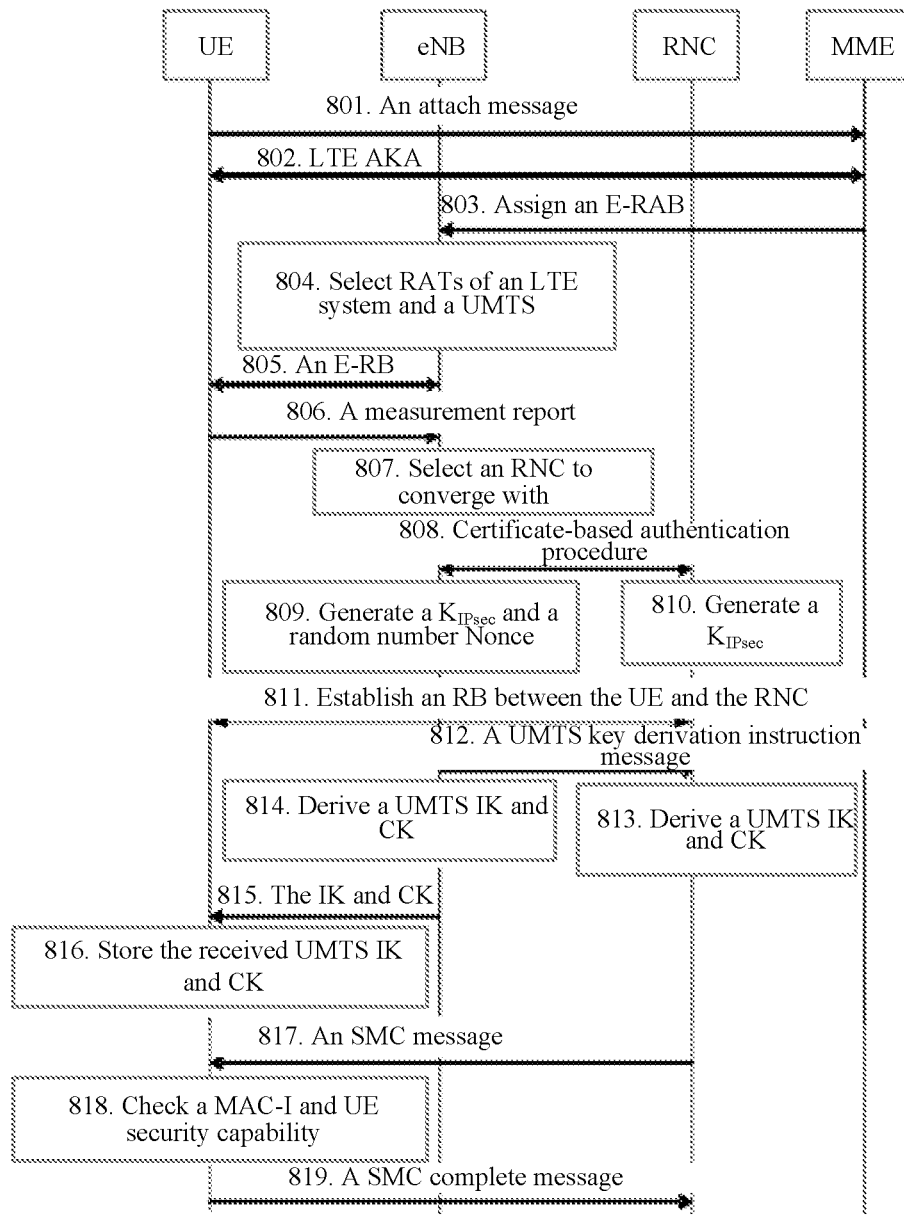
FIG. 8 is a flowchart of a method for key generation according to Embodiment 7 of the present invention.

FIG. 8 is a flowchart of a method for key generation according to Embodiment 7 of the present invention. In this embodiment, it is assumed that a connection between an eNB and an RNC is insecure and requires certificate-based authentication, so as to establish a secure channel and generate an internet protocol security key $K_{IPsec}$.

As shown in FIG. 8, the method for key generation may include:

Step 801: A UE sends an attach request message to an MME, requesting to access an LTE network.

Step 802: The UE and the MME perform an LTE AKA procedure to complete bi-directional authentication between the UE and the MME and generate a key to an LTE system.

Step 803: The MME assigns an E-RAB to an eNB after the authentication between the UE and the MME is successful.

Step 804: The eNB selects RATs of the LTE system and a UMTS according to the assigned E-RAB.

Step 805: Establish an E-RB between the UE and the eNB.

Step 806: The UE measures a UMTS cell that may be cooperated with, obtains a measurement report, and sends the measurement report to the eNB.

Step 807: The eNB selects an RNC to converge with according to a measurement result of the UMTS cell that is reported by the UE.

Step 808: The eNB and the RNC need to perform a certificate-based authentication procedure to ensure that a channel between the eNB and the RNC is secure.

Step 809: The eNB generates an internet protocol security key ($K_{IPsec}$) and a random number sec, Nonce through the authentication procedure between the eNB and the RNC.

Step 810: The RNC also generates a $K_{IPsec}$ through the authentication procedure between the eNB and the RNC.

In this embodiment, steps 809 and 810 may be performed in sequence or at the same time.

Step 811: Establish an RB between the UE and the RNC.

Step 812: The eNB sends a UMTS key derivation instruction message to the RNC, where the UMTS key derivation instruction message carries a random number Nonce.

Step 813: The RNC derives, according to the $K_{IPsec}$ and the random number Nonce, a UMTS IK and CK after the RNC receives the random number Nonce, that is, IK||CK=KDF ($K_{IPsec}$, Nonce).

Step 814: The eNB derives, according to the $K_{IPsec}$ and the random number Nonce, a UMTS IK and CK.

Step 815: The eNB sends the derived UMTS IK and CK to the UE through an AS message under cipher and integrity protection.

Step 816: The UE stores the received UMTS IK and CK.

Step 817: The RNC sends an SMC message to the UE, where the SMC message carries: a cipher algorithm and an integrity algorithm that are selected by the RNC according to a UE security capability, a generated parameter value (Fresh) and the UE security capability, and a MAC-I generated according to the IK, an integrity sequence number, the SMC message, a direction indication, and the Fresh through an F9 algorithm, and at the same time, the SMC message is under integrity protection.

Step 818: The UE checks the MAC-I and UE security capability after receiving the SMC message.

Specifically, the UE may generate an XMAC-I according to the IK of the UE, the integrity sequence number, the direction indication, the SMC message, and a parameter value (Fresh) carried in the SMC message through the F9 algorithm after receiving the SMC message. Then the UE checks whether the XMAC-I is the same as a MAC-I carried in the SMC message to determine whether the SMC message is complete. If the XMAC-I is the same as the MAC-I carried in the SMC message, the UE may determine that the SMC message is complete. In addition, the UE further checks whether a UE security capability carried in the SMC message is consistent with a security capability of the UE itself.

The UE performs an operation provided in step 819 after it determines that the SMC message is complete and the UE security capability carried in the SMC message is consistent with the security capability of the UE itself. If the UE determines that the SMC message is incomplete or the UE security capability carried in the SMC message is inconsistent with the security capability of the UE itself, the UE terminates this procedure.

Step 819: The UE sends an SMC complete message under integrity protection to the MME.

In this embodiment, the UMTS key need to be updated in the following scenario:

(1) when a lifecycle (START) of the UMTS key reaches a preset threshold, the UE sends a UMTS key update request message to the eNB. The eNB generates a new Nonce after receiving the UMTS key update request message, and rederives, according to the new Nonce and the $K_{IPsec}$, a new UMTS IK and CK.

In the embodiment of the present invention shown in FIG. 8, the LTE system and UMTS have their own SRB. When the LTE system and UMTS share an SRB, the procedure for sending an SMC message may be shown in FIG. 3, and details are not described herein again.

In this embodiment, an eNB and an RNC may derive, according to $K_{IPsec}$ and a random number generated by the eNB, a UMTS IK and CK. Then the eNB sends the derived UMTS IK and CK to a UE, thereby enabling the derivation of the UMTS integrity key and cipher key in a UL Boosting scenario that has an eNB as an anchor point, enabling the UE to communicate securely through a UMTS, and further improving security of data transmitted in the UMTS.

Figure 9:
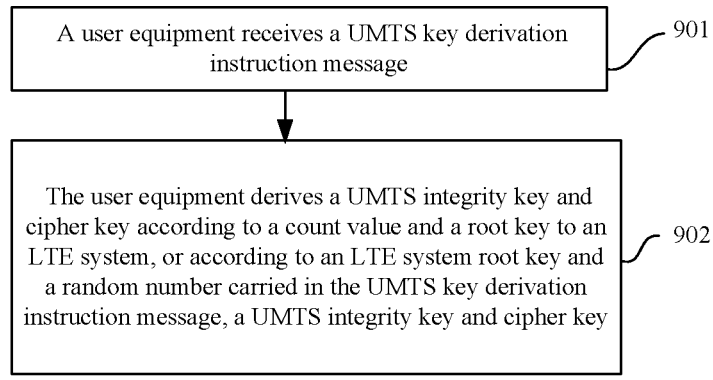
FIG. 9 is a flowchart of a method for key generation according to Embodiment 8 of the present invention.

FIG. 9 is a flowchart of a method for key generation according to Embodiment 8 of the present invention. As shown in FIG. 9, the method for key generation may include:

Step 901: A user equipment receives a UMTS key derivation instruction message.

Step 902: The user equipment derives, according to a count value and a root key to an LTE system, or according to an LTE system root key and a random number carried in the UMTS key derivation instruction message, a UMTS integrity key and cipher key.

In an implementation manner of this embodiment, the root key to the LTE system includes a non-access stratum root key to the LTE system, the count value of the LTE system includes a current non-access stratum count value of the LTE system, and the random number carried in the UMTS key derivation instruction message includes a random number generated by a core network node. In this case, the user equipment receiving the UMTS key derivation instruction message may be implemented as follows: The user equipment receives the UMTS key derivation instruction message from the core network node.

The user equipment deriving, according to the count value and root key to the LTE system, or according to the LTE system root key and the random number carried in the UMTS key derivation instruction message, the UMTS integrity key and cipher key may be implemented as follows: The user equipment derives, according to the current non-access stratum count value of the LTE system and the non-access stratum root key to the LTE system, or according to the non-access stratum root key to the LTE system and the random number generated by the core network node, the UMTS integrity key and cipher key.

In another implementation manner of this embodiment, the LTE system root key includes an access layer root key to the LTE system, the count value of the LTE system includes a packet data convergence protocol count value of the LTE system, and the random number carried in the UMTS key derivation instruction message includes a random number generated by an access network node of the LTE system. In this case, the user equipment receiving the UMTS key derivation instruction message may be implemented as follows: The user equipment receives the UMTS key derivation instruction message from the access network node of the LTE system, where the UMTS key derivation instruction message carries the random number generated by the access network node of the LTE system.

The user equipment deriving, according to the count value and root key to the LTE system, or according to the LTE system root key and the random number carried in the UMTS key derivation instruction message, the UMTS integrity key and cipher key may be implemented as follows: The user equipment derives, according to the packet data convergence protocol count value of the LTE system and the access layer root key to the LTE system, or according to the access layer root key to the LTE system and the random number generated by the access network node of the LTE system, the UMTS integrity key and cipher key.

In this embodiment, a user equipment can derive, according to a count value and a root key to an LTE system, or according to an LTE system root key and a random number carried in a UMTS key derivation instruction message, a UMTS integrity key and cipher key, thereby enabling the derivation and generation of the UMTS integrity key and cipher key in a UL Boosting scenario that has an eNB as an anchor point, enabling the UE to communicate securely through a UMTS, and further improving security of data transmitted in the UMTS.

Figure 10:
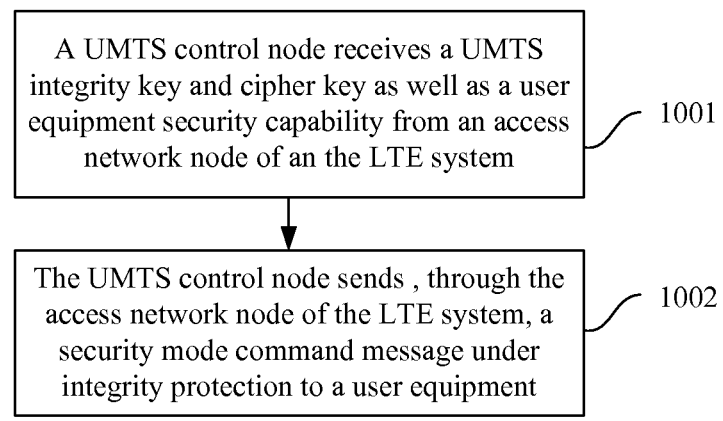
FIG. 10 is a flowchart of a message sending method according to Embodiment 2 of the present invention.

FIG. 10 is a flowchart of a message sending method according to Embodiment 2 of the present invention. As shown in FIG. 10, the message sending method may include:

Step 1001: A UMTS control node receives a UMTS integrity key and cipher key as well as a user equipment security capability from an access network node of an LTE system.

Step 1002: The UMTS control node sends, through the access network node of the LTE system, a security mode command message under integrity protection to a user equipment, where the security mode command message carries: an integrity algorithm and a cipher algorithm that are selected by the control node according to the user equipment security capability, the user equipment security capability and parameter values generated by the control node, and an integrity message authentication code generated by the control node according to the UMTS integrity key, the parameter values generated by the control node, an integrity sequence number, the security mode command message, and a direction indication.

In this embodiment, after the UMTS control node sends, through the access network node of the LTE system, the security mode command message under integrity protection to the user equipment, the UMTS control node may further receive a security mode command complete message under integrity protection that is sent, through the access network node of the LTE system, from the user equipment, where the user equipment sends the security mode command complete message to the UMTS control node through the access network node of the LTE system in the following scenario: After the user equipment receives the security mode command message, the user equipment generates an integrity message authentication code according to a user equipment integrity key to UMTS, the integrity sequence number, the direction indication, the security mode command message, and parameter values carried in the security mode command message; additionally, the user equipment determines that the integrity message authentication code generated by the user equipment is consistent with an integrity message authentication code carried in the security mode command message and the user equipment security capability carried in the security mode command message is consistent with a security capability of the user equipment itself.

In this embodiment, a UMTS control node sends a security mode command message to a user equipment through an access network node of an LTE system and receives a security mode command complete message sent, through the access network node of the LTE system, from a user equipment. In this case, the UMTS control node and the user equipment may perform an SMC procedure to negotiate a cipher algorithm and an integrity algorithm when the LTE system and a UMTS share an SRB.

Persons of ordinary skill in the art may understand that all or a part of the steps of the methods in the embodiments may be implemented by a computer program instructing relevant hardware. The program may be stored in a computer readable storage medium. When the program is run, the steps of the methods in the embodiments are performed. The storage medium includes any medium capable of storing program codes, such as a ROM, a RAM, a magnetic disk, or an optical disk.

Figure 11:
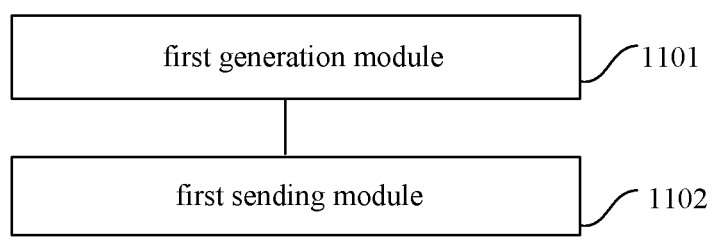
FIG. 11 is a schematic structural diagram of a core network node according to Embodiment 1 of the present invention.

FIG. 11 is a schematic structural diagram of a core network node according to Embodiment 1 of the present invention. In this embodiment, the core network node may be applied to a UL Boosting scenario that has a base station as an anchor point to implement the procedure of the embodiment of the present invention shown in FIG. 1. As shown in FIG. 11, the core network node may include: a first generation module 1101 and a first sending module 1102, where the first generation module 1101 is configured to derive, according to a non-access stratum root key to an LTE system and a current non-access stratum count value of the LTE system, or according to a non-access stratum root key to an LTE system and a random number generated by the core network node, a UMTS integrity key and cipher key; and the first sending module 1102 is configured to send the UMTS integrity key and cipher key derived by the first generation module 1101 to a control node of a UMTS, so that the control node of the UMTS implements cipher and integrity protection by using the UMTS integrity key and cipher key.

In this embodiment, the core network node may be a node that provides the core network function, such as an MME. However, this embodiment does not define a specific form of the core network node.

In the core network node, a first generation module 1101 may derive, according to a non-access stratum root key to the LTE system and a current non-access stratum count value of the LTE system, or according to a non-access stratum root key to the LTE system and a random number generated by the core network node on the LTE system, a UMTS integrity key and cipher key, thereby enabling the derivation and generation of the UMTS integrity key and cipher key in a UL Boosting scenario that has an eNB as an anchor point, enabling a user equipment to communicate securely through a UMTS, and further improving security of data transmitted in the UMTS.

Figure 12:
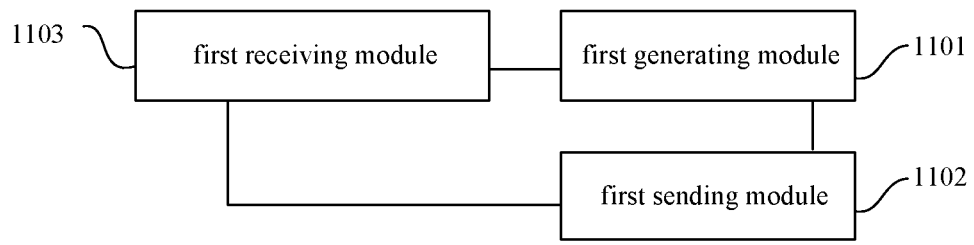
FIG. 12 is a schematic structural diagram of a core network node according to Embodiment 2 of the present invention.

FIG. 12 is a schematic structural diagram of a core network node according to Embodiment 2 of the present invention. Compared with the core network node shown in FIG. 11, the difference is that the core network node shown in FIG. 12 may further include:

a first receiving module 1103, configured to receive a UMTS key derivation instruction message from an access network node on the LTE system, where the UMTS key derivation instruction message is used to trigger the first generation module 1101 to derive the UMTS integrity key and cipher key.

In an implementation manner of this embodiment, the first sending module 1102 may further send a UMTS key derivation instruction message to a user equipment, so that the user equipment derives, according to the current non-access stratum count value of the LTE system and the non-access stratum root key to the LTE system, or according to the non-access stratum root key to the LTE system and a random number carried in the UMTS key derivation instruction message, a UMTS integrity key and cipher key.

In another implementation manner of this embodiment, the first sending module 1102 may further send the UMTS integrity key and cipher key derived by the first generation module 1101 to a user equipment through a non-access stratum message, so that the user equipment stores the UMTS integrity key and cipher key.

In this embodiment, the first sending module 1102 may send the UMTS integrity key and cipher key to the access network node in the LTE system, so that the access network node in the LTE system sends the UMTS integrity key and cipher key to the control node of the UMTS.

Furthermore, when a lifecycle of the UMTS key reaches a preset threshold, the first receiving module 1103 may further receive a UMTS key update request message or notification from the user equipment.

At this time, the first generation module 1101 may further rederive, according to the current non-access stratum count value of the LTE system and the non-access stratum root key to the LTE system, a UMTS integrity key and cipher key after the first receiving module 1103 receives the UMTS key update request message; or, the first generation module 1101 may further generate a new random number after the first generation module 1101 after the first receiving module 1103 receives the UMTS key update request message, and rederive, according to the new random number and the non-access stratum root key to the LTE system, a UMTS integrity key and cipher key; or, the first generation module 1101 may further rederive a UMTS integrity key and cipher key through a re-authentication and key agreement procedure after the first receiving module 1103 receives the notification.

The core network node can enable the derivation of a UMTS integrity key and cipher key in a UL Boosting scenario that has an eNB as an anchor point, enable a user equipment to communicate securely through a UMTS, and further improve security of data transmitted in the UMTS.

Figure 13:
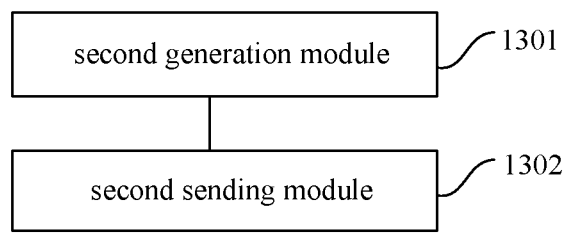
FIG. 13 is a schematic structural diagram of an access network node according to Embodiment 1 of the present invention.

FIG. 13 is a schematic structural diagram of an access network node according to Embodiment 1 of the present invention. In this embodiment, the access network node may be applied to a UL Boosting scenario that has a base station as an anchor point to implement the procedure of the embodiment of the present invention shown in FIG. 1. As shown in FIG. 13, the access network node may include:

a second generation module 1301, configured to derive, according to an access layer root key to an LTE system and a packet data convergence protocol count value of the LTE system, or according to an access layer root key to the LTE system and a random number generated by the access network node, a UMTS integrity key and cipher key; and a second sending module 1302, configured to send the UMTS integrity key and cipher key derived by the second generation module 1301 to a control node of a UMTS, so that the control node of the UMTS implements cipher and integrity protection by using the UMTS integrity key and cipher key.

The access network node in this embodiment may be a node that has an access function, such as a base station. The base station may include an eNB. The eNB may be a common macro base station or a small base station, including an HeNB/HNB, or an RN. However, this embodiment does not define a specific form of the access network node.

In the access network node, a second generation module 1301 may derive, according to an access layer root key to the LTE system and a packet data convergence protocol count value of the LTE system, or according to an access layer root key to the LTE system and a random number generated by the access network node of the LTE system, a UMTS integrity key and cipher key, thereby enabling the derivation of the UMTS integrity key and cipher key in a UL Boosting scenario that has an eNB as an anchor point, enabling a user equipment to communicate securely through a UMTS, and further improving security of data transmitted in the UMTS.

Figure 14:
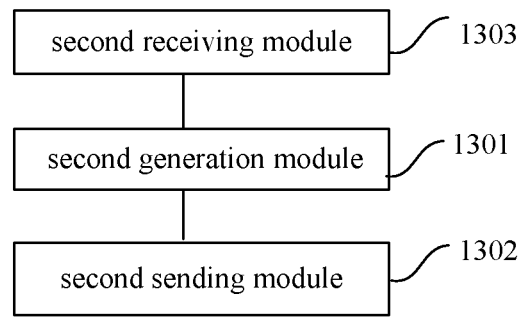
FIG. 14 is a schematic structural diagram of an access network node according to Embodiment 2 of the present invention.

FIG. 14 is a schematic structural diagram of an access network node according to Embodiment 2 of the present invention. Compared with the access network node shown in FIG. 13, the difference is that, in an implementation manner of the access network node shown in FIG. 14, the second sending module 1302 may further send a UMTS key derivation instruction message to a user equipment, so that the user equipment derives, according to the access layer root key to the LTE system and the packet data convergence protocol count value of the LTE system, or according to the access layer root key to the LTE system and a random number generated by the access network node on the LTE system and carried in the UMTS key derivation instruction message, a UMTS integrity key and cipher key.

In another implementation manner of this embodiment, the second sending module 1302 may further send, through an access layer message under cipher and integrity protection, the UMTS integrity key and cipher key derived by the second generation module 1301 to a user equipment, so that the user equipment stores the UMTS integrity key and cipher key.

Furthermore, the access network node in this embodiment may further include:

a second receiving module 1303, configured to: when a lifecycle of the UMTS key reaches a preset threshold, receive a UMTS key update request message or notification from the user equipment.

At this time, when the packet data convergence protocol count value of the LTE system overflows or the user equipment changes from an idle state to a connected state, the second generation module 1301 may further derive, according to the packet data convergence protocol count value of the LTE system and an access layer root key updated by the access network node, or according to an access layer root key updated by the access network node and a random number newly generated by the access network node, a UMTS integrity key and cipher key; or, the second generation module 1301 may further generate a new random number after the second receiving module 1303 receives the UMTS key update request message, and rederive, according to the new random number and the access layer root key to the LTE system, a UMTS integrity key and cipher key; or, the second generation module 1301 may further rederive, through a re-authentication and key agreement procedure, a UMTS integrity key and cipher key after the second receiving module 1303 receives the notification.

The access network node can enable the derivation of a UMTS integrity key and cipher key in a UL Boosting scenario that has an eNB as an anchor point, enable a user equipment to communicate securely through a UMTS, and further improve security of data transmitted in the UMTS.

Figure 15:
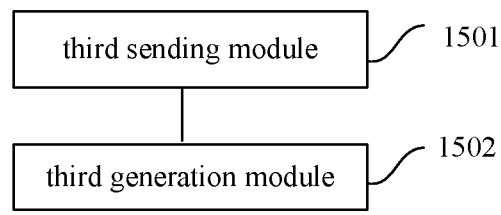
FIG. 15 is a schematic structural diagram of an access network node according to Embodiment 3 of the present invention.

FIG. 15 is a schematic structural diagram of an access network node according to Embodiment 3 of the present invention. In this embodiment, the access network node may be applied to a UL Boosting scenario that has a base station as an anchor point to implement the procedure of the embodiment of the present invention shown in FIG. 7. As shown in FIG. 15, the access network node may include:

a third sending module 1501, configured to send a UMTS key derivation instruction message to a control node of a UMTS, where the UMTS key derivation instruction message carries a random number generated by the access network node, so that the control node of the UMTS generates, according to an internet protocol security key and the random number, a UMTS integrity key and cipher key; and a third generation module 1502, configured to derive, according to the internet protocol security key and the random number, a UMTS integrity key and cipher key.

The access network node in this embodiment may be a node that has an access function, such as a base station. The base station may include an eNB. The eNB may be a common macro base station or a small base station, including an HeNB/HNB, or an RN. However, this embodiment does not define a specific form of the access network node.

In the access network node, a third generation module 1502 may derive, according to an internet protocol security key and a random number generated by the access network node, a UMTS integrity key and cipher key, thereby enabling the derivation and generation of the UMTS integrity key and cipher key in a UL Boosting scenario that has an eNB as an anchor point, enabling a user equipment to communicate securely through a UMTS, and further improving security of data transmitted in the UMTS.

Figure 16:
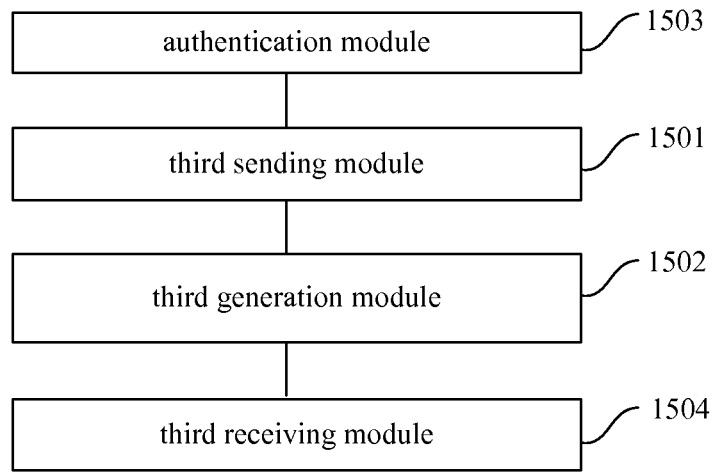
FIG. 16 is a schematic structural diagram of an access network node according to Embodiment 4 of the present invention.

FIG. 16 is a schematic structural diagram of an access network node according to Embodiment 4 of the present invention. Compared with the access network node shown in FIG. 15, the difference is that, in the access network node shown in FIG. 16, the third sending module 1501 may further send, through an access layer message under cipher and integrity protection, the UMTS integrity key and cipher key to the user equipment, so that the user equipment stores the UMTS integrity key and cipher key.

Furthermore, the access network node in this embodiment may further include:

an authentication module 1503, configured to perform a certificate-based authentication procedure with the control node of the UMTS to generate the internet protocol security key and the random number;

a third receiving module 1504, configured to: when a lifecycle of the UMTS key reaches a preset threshold, receive a UMTS key update request message from the user equipment; where at this time, the third generation module 1502 may further regenerate a new random number after the third receiving module 1504 receives the UMTS key update request message, and rederive, according to the new random number and the internet protocol security key, a UMTS integrity key and cipher key.

The access network node can enable the derivation of a UMTS integrity key and cipher key in a UL Boosting scenario that has an eNB as an anchor point, enable a user equipment to communicate securely through a UMTS, and further improve security of data transmitted in the UMTS.

Figure 17:
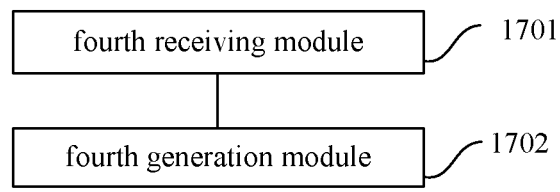
FIG. 17 is a schematic structural diagram of a user equipment according to Embodiment 1 of the present invention.

FIG. 17 is a schematic structural diagram of a user equipment according to Embodiment 1 of the present invention. In this embodiment, the user equipment may be applied to a UL Boosting scenario that has a base station as an anchor point to implement the procedure of the embodiment of the present invention shown in FIG. 9. As shown in FIG. 17, the user equipment may include:

a fourth receiving module 1701, configured to receive a UMTS key derivation instruction message; and a fourth generation module 1702, configured to derive, according to a count value and a root key to an LTE system, or according to an LTE system root key and a random number carried in the UMTS key derivation instruction message, a UMTS integrity key and cipher key.

In an implementation manner of this embodiment, the fourth receiving module 1701 may receive, when the LTE system root key is a non-access stratum root key to the LTE system, the count value of the LTE system is a current non-access stratum count value of the LTE system, and the random number carried in the UMTS key derivation instruction message is a random number generated by a core network node, the UMTS key derivation instruction message from the core network node; and at this time, the fourth generation module 1702 may derive, according to the current non-access stratum count value of the LTE system and the non-access stratum root key to the LTE system, or according to the non-access stratum root key to the LTE system and the random number generated by the core network node, the UMTS integrity key and cipher key.

In another implementation manner of this embodiment, the fourth receiving module 1701 may receive, when the LTE system root key is an access layer root key to the LTE system, the count value of the LTE system is a packet data convergence protocol count value of the LTE system, and the random number carried in the UMTS key derivation instruction message is a random number generated by an access network node of the LTE system, the UMTS key derivation instruction message from the access network node on the LTE system; and at this time, the fourth generation module 1702 may derive, according to the packet data convergence protocol count value of the LTE system and the access layer root key to the LTE system, or according to the access layer root key to the LTE system and the random number generated by the access network node on the LTE system, the UMTS integrity key and cipher key.

In the user equipment, a fourth generation module 1702 may derive, according to a count value and a root key to an LTE system, or according to an LTE system root key and a random number carried in a UMTS key derivation instruction message, a UMTS integrity key and cipher key, thereby enabling the derivation of the UMTS integrity key and cipher key in a UL Boosting scenario that has an eNB as an anchor point, enabling the UE to communicate securely through a UMTS, and further improving security of data transmitted in the UMTS.

Figure 18:
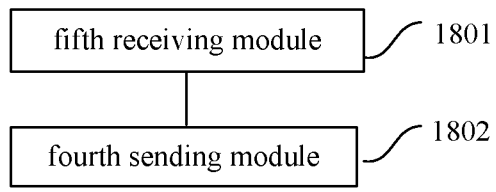
FIG. 18 is a schematic structural diagram of a control node according to Embodiment 1 of the present invention.

FIG. 18 is a schematic structural diagram of a control node according to Embodiment 1 of the present invention. In this embodiment, the control node may be applied to a UL Boosting scenario that has a base station as an anchor point to implement the procedure of the embodiment of the present invention shown in FIG. 3 or FIG. 10. As shown in FIG. 18, the control node may include:

a fifth receiving module 1801, configured to receive a UMTS integrity key and cipher key as well as a user equipment security capability from an access network node on an LTE system; and a fourth sending module 1802, configured to send, through the access network node on the LTE system, a security mode command message under integrity protection to a user equipment, where the security mode command message carries: an integrity algorithm and a cipher algorithm that are selected by the control node according to a user equipment security capability, user equipment security capability and parameter values generated by the control node, and an integrity message authentication code generated by the control node according to the UMTS integrity key, the parameter values generated by the control node, an integrity sequence number, the security mode command message, and a direction indication.

In this embodiment, after the fourth sending module 1802 sends the security mode command message to the user equipment, the fifth receiving module 1801 may further receive a security mode command complete message under integrity protection that is sent, through the access network node on the LTE system, from the user equipment, where the user equipment sends the security mode command complete message to the control node through the access network node on the LTE system in the following scenario: After the user equipment receives the security mode command message, the user equipment generates an integrity message authentication code according to a user equipment integrity key to UMTS, the integrity sequence number, the direction indication, the security mode command message, and parameter values carried in the security mode command message; additionally, the user equipment determines that the integrity message authentication code generated by the user equipment is consistent with an integrity message authentication code carried in the security mode command message and the user equipment security capability carried in the security mode command message is consistent with a security capability of the user equipment itself.

The control node in this embodiment may serve as a control node of the UMTS and the control node may be an entity that has a control function, such as an RNC.

In the control node, a fourth sending module 1802 may send a security mode command message to a user equipment through an access network node of an LTE system and a fifth receiving module 1801 may receive a security mode command complete message sent, through the access network node of the LTE system, from the user equipment. In this case, the control node and the user equipment may perform an SMC procedure to negotiate a cipher algorithm and an integrity algorithm when the LTE system and a UMTS share an SRB.

It should be understood by persons skilled in the art that the accompanying drawings are merely schematic diagrams of exemplary embodiments, and modules or processes in the accompanying drawings are not necessarily required for implementing the present invention.

Persons skilled in the art may understand that the modules in the apparatuses provided in the embodiments may be distributed in the apparatuses according to the description of the embodiments, or may be arranged in one or more apparatuses different from those described in the embodiments. The modules in the embodiments may be combined into one module, or split into a plurality of sub-modules.

Finally, it should be noted that, the embodiments are merely intended for describing the technical solutions of the present invention rather than limiting the present invention. Although the present invention is described in detail with reference to the embodiments, persons skilled in the art should understand that they may still make modifications to the technical solutions described in the embodiments or make equivalent replacements to some technical features thereof, as long as these modifications or replacements do not make the essence of corresponding technical solutions depart from the spirit and scope of the technical solutions of the embodiments of the present invention.

What is claimed is:

1. A method for key generation, applied to a universal mobile telecommunications system (UMTS)-long term evolution (LTE) resource convergence scenario that has a base station as an anchor point, the method comprising:

after establishing a Radio Bearer between a User Equipment (UE), which is served by an LTE system, and a UMTS control node, deriving, according to a root key and a count value of the LTE system, or according to a random number and a root key of the LTE system, a UMTS integrity key and cipher key; and sending the UMTS integrity key and cipher key to the UMTS control node, so that the UMTS control node implements cipher and integrity protection by using the UMTS integrity key and cipher key.

2. The method according to claim 1, wherein the LTE system root key comprises a non-access stratum root key to the LTE system and the count value of the LTE system comprises a current non-access stratum count value of the LTE system;

before the deriving, according to a root key and a count value of an LTE system, or according to a random number and an LTE system root key, a UMTS integrity key and cipher key, the method further comprises:

receiving, by a core network node of the LTE system, a UMTS key derivation instruction message from an access network node of the LTE system; and the deriving, according to a root key and a count value of an LTE system, or according to a random number and an LTE system root key, a UMTS integrity key and cipher key comprises:

deriving, by the core network node of the LTE system, according to the current non-access stratum count value of the LTE system and the non-access stratum root key to the LTE system, or according to the non-access stratum root key to the LTE system and a random number generated by the core network node of the LTE system, a UMTS integrity key and cipher key.

3. The method according to claim 2, wherein the sending the UMTS integrity key and cipher key to a UMTS control node comprises:

sending, by the core network node of the LTE system, the UMTS integrity key and cipher key to the access network node of the LTE system, so that the access network node of the LTE system sends the UMTS integrity key and cipher key to the UMTS control node.

4. The method according to claim 1, wherein the LTE system root key comprises an access layer root key to the LTE system and the count value of the LTE system comprises a packet data convergence protocol count value of the LTE system; and the deriving, according to a root key and a count value of an LTE system, or according to a random number and an LTE system root key, a UMTS integrity key and cipher key comprises:

deriving, by an access network node of the LTE system, according to the access layer root key to the LTE system and the packet data convergence protocol count value of the LTE system, or according to the access layer root key to the LTE system and a random number generated by the access network node of the LTE system, a UMTS integrity key and cipher key.

5. The method according to claim 4, wherein the sending the UMTS integrity key and cipher key to the UMTS control node, comprising:

sending, by the access network node of the LTE system, the UMTS integrity key and cipher key to the UMTS control node.

6. The method according to claim 1, further comprising:

receiving, by the UMTS control node, the UMTS integrity key and cipher key as well as the UE security capability;

sending, by the UMTS control node, through an access network node of the LTE system, a security mode command message under integrity protection to a user equipment, wherein the security mode command message carries: an integrity algorithm and a cipher algorithm that are selected by the UMTS control node according to the UE security capability, the UE security capability and parameter values generated by the UMTS control node, and an integrity message authentication code generated by the UMTS control node according to the UMTS integrity key, the parameter values generated by the UMTS control node, an integrity sequence number, the security mode command message, and a direction indication; and receiving, by the UMTS control node, a security mode command complete message under integrity protection that is sent, through the access network node of the LTE system, from the UE, wherein the UE sends the security mode command complete message to the UMTS control node through the access network node of the LTE system in the following scenario: after the UE receives the security mode command message, the UE generates an integrity message authentication code according to a UE integrity key to UMTS, the integrity sequence number, the direction indication, the security mode command message, and parameter values carried in the security mode command message; additionally, the UE determines that the integrity message authentication code generated by the UE is consistent with an integrity message authentication code carried in the security mode command message and the UE security capability carried in the security mode command message is consistent with a security capability of the UE itself.

7. A method for key generation, applied to a universal mobile telecommunications system (UMTS)-long term evolution (LTE) resource convergence scenario that has a base station as an anchor point, the method comprising:

after establishing a Radio Bearer between a User Equipment (UE), which is served by an LTE system, and a UMTS control node, sending, by an access network node of the LTE system, a UMTS key derivation instruction message to the UMTS control node, wherein the UMTS key derivation instruction message carries a random number generated by the access network node of the LTE system, so that the UMTS control node generates, according to an internet protocol security key and the random number, a UMTS integrity key and cipher key; and deriving, by the access network node of the LTE system, according to the internet protocol security key and the random number, a UMTS integrity key and cipher key.

8. The method according to claim 7, before the sending, by an access network node of an LTE system, a UMTS key derivation instruction message to a UMTS control node, further comprising:

performing, by the access network node of the LTE system and the UMTS control node, a certificate-based authentication procedure, so as to generate the internet protocol security key and the random number.

9. A method for key generation, applied to a universal mobile telecommunications system (UMTS)-long term evolution (LTE) resource convergence scenario that has a base station as an anchor point, the method comprising:

receiving, by a user equipment (UE) served by an LTE system, a UMTS key derivation instruction message after a Radio Bearer between the UE and a UMTS control node is established; and deriving, by the UE, according to a count value and a root key to the LTE system, or according to a root key of the LTE system and a random number carried in the UMTS key derivation instruction message, a UMTS integrity key and cipher key.

10. The method according to claim 9, wherein the LTE system root key comprises a non-access stratum root key to the LTE system, the count value of the LTE system comprises a current non-access stratum count value of the LTE system, and the random number carried in the UMTS key derivation instruction message comprises a random number generated by a core network node of the LTE system;

the receiving, by the UE, a UMTS key derivation instruction message comprises:

receiving, by the UE, the UMTS key derivation instruction message from the core network node of the LTE system; and the deriving, by the UE, according to a count value and a root key to an LTE system, or according to an LTE system root key and a random number carried in the UMTS key derivation instruction message, a UMTS integrity key and cipher key comprises:

deriving, by the UE, according to the current non-access stratum count value of the LTE system and the non-access stratum root key to the LTE system, or according to the non-access stratum root key to the LTE system and the random number generated by the core network node of the LTE system, the UMTS integrity key and cipher key.

11. The method according to claim 9, wherein the LTE system root key comprises an access layer root key to the LTE system, the count value of the LTE system comprises a packet data convergence protocol count value of the LTE system, and the random number carried in the UMTS key derivation instruction message comprises a random number generated by an access network node of the LTE network;

the receiving, by the UE, a UMTS key derivation instruction message comprises:

receiving, by the UE, the UMTS key derivation instruction message from the access network node of the LTE system; wherein the UMTS key derivation instruction message carries the random number generated by the access network node of the LTE system; and the deriving, by the UE, according to a count value and a root key to an LTE system, or according to an LTE system root key and a random number carried in the UMTS key derivation instruction message, a UMTS integrity key and cipher key comprises:

deriving, by the UE, according to the packet data convergence protocol count value of the LTE system and the access layer root key to the LTE system, or according to the access layer root key to the LTE system and the random number generated by the access network node of the LTE system, the UMTS integrity key and cipher key.

12. A message sending method, applied to a universal mobile telecommunications system (UMTS)-long term evolution (LTE) resource convergence scenario that has a base station as an anchor point, the method comprising:

receiving, by a UMTS control node, a UMTS integrity key and cipher key as well as a user equipment (UE) security capability from an access network node of an LTE system, after a Radio Bearer between the UE, which is served by the LTE system, and the UMTS control node is established; and sending, by the UMTS control node, through the access network node of the LTE system, a security mode command message under integrity protection to the UE, wherein the security mode command message carries: an integrity algorithm and a cipher algorithm that are selected by the UMTS control node according to the UE security capability, the UE security capability and parameter values generated by the UMTS control node, and an integrity message authentication code generated by the UMTS control node according to the UMTS integrity key, the parameter values generated by the UMTS control node, an integrity sequence number, the security mode command message, and a direction indication.

13. The method according to claim 12, after the sending, by the UMTS control node, through the access network node of the LTE system, a security mode command message under integrity protection to the UE, further comprising:

receiving, by the UMTS control node, a security mode command complete message under integrity protection that is sent, through the access network node of the LTE system, from the UE, wherein the UE sends the security mode command complete message to the UMTS control node through the access network node of the LTE system in the following scenario: after the UE receives the security mode command message, the UE generates an integrity message authentication code according to a UE integrity key to UMTS, the integrity sequence number, the direction indication, the security mode command message, and parameter values carried in the security mode command message; additionally, the UE determines that the integrity message authentication code generated by the UE is consistent with an integrity message authentication code carried in the security mode command message and the UE security capability carried in the security mode command message is consistent with a security capability of the UE itself.

14. A core network node for a long term evolution (LTE) system, applied to a universal mobile telecommunications system (UMTS) LTE resource convergence scenario that has a base station as an anchor point, the core network node comprising:

non-transitory computer readable storage medium to store program(s), and computer hardware configured, including configured by the program(s), to implement:

after establishing a Radio Bearer between a User Equipment (UE), which is served by the LTE system, and a UMTS control node, to derive, according to a non-access stratum root key to the LTE system and a current non-access stratum count value of the LTE system, or according to a non-access stratum root key to the LTE system and a random number generated by the core network node, a UMTS integrity key and cipher key; and to send the UMTS integrity key and cipher key derived by the first generation module to the UMTS control node, so that the UMTS control node implements cipher and integrity protection by using the UMTS integrity key and cipher key.

15. The core network node according to claim 14, wherein the computer hardware is further configured to:

to receive a UMTS key derivation instruction message from an access network node of the LTE system; wherein the UMTS key derivation instruction message is used to trigger the first generation module to derive the UMTS integrity key and cipher key.

16. The core network node according to claim 14, wherein the computer hardware is further configured to:

to send the UMTS integrity key and cipher key to an access network node of the LTE system, so that the access network node sends the UMTS integrity key and cipher key to the UMTS control node.

17. An access network node for a long term evolution (LTE) system, applied to a universal mobile telecommunications system (UMTS) LTE resource convergence scenario that has a base station as an anchor point, the access network node comprising:

non-transitory computer readable storage medium to store program(s), and computer hardware configured, including configured by the program(s), to implement:

after establishing a Radio Bearer between a User Equipment (UE), which is served by the LTE system, and a UMTS control node, to derive, according to an access layer root key to the LTE system and a packet data convergence protocol count value of the LTE system, or according to an access layer root key to the LTE system and a random number generated by the access network node, a UMTS integrity key and cipher key; and to send the UMTS integrity key and cipher key derived by the second generation module to the UMTS control node, so that the UMTS control node implements cipher and integrity protection by using the UMTS integrity key and cipher key.

18. The access network node according to claim 17, wherein the computer hardware is further configured to:

send a UMTS key derivation instruction message to the UE, so that the UE derives, according to the access layer root key to the LTE system and the packet data convergence protocol count value of the LTE system, or according to the access layer root key to the LTE system and a random number generated by the access network node and carried in the UMTS key derivation instruction message, a UMTS integrity key and cipher key.

19. An access network node for a long term evolution (LTE) system, applied to a universal mobile telecommunications system (UMTS) LTE resource convergence scenario that has a base station as an anchor point, the access network node comprising:

non-transitory computer readable storage medium to store program(s), and computer hardware configured, including configured by the program(s), to implement:

to send a UMTS key derivation instruction message to a control node of a UMTS after a Radio Bearer between a User Equipment (UE) served by an LTE system and the UMTS control node is established, wherein the UMTS key derivation instruction message carries a random number generated by the access network node, so that the UMTS control node generates, according to an internet protocol security key and the random number, a UMTS integrity key and cipher key; and to derive, according to the internet protocol security key and the random number, a UMTS integrity key and cipher key.

20. The access network node according to claim 19, the computer hardware is further is further configured:

to perform a certificate-based authentication procedure with the UMTS control node to generate the internet protocol security key and the random number.

21. A user equipment (UE), applied to a universal mobile telecommunications system (UMTS)-long term evolution (LTE) resource convergence scenario that has a base station as an anchor point, the UE comprising:

non-transitory computer readable storage medium to store program(s), and computer hardware configured, including configured by the program(s), to implement:

to receive a UMTS key derivation instruction message after a Radio Bearer between the UE, which is served by an LTE system, and a UMTS control node is established; and to derive, according to a count value and a root key to the LTE system, or according to a root key of the LTE system and a random number carried in the UMTS key derivation instruction message, a UMTS integrity key and cipher key.

22. The user equipment according to claim 21, wherein the computer hardware is further configured to receive, when the LTE system root key is a non-access stratum root key to the LTE system, the count value of the LTE system is a current non-access stratum count value of the LTE system, and the random number carried in the UMTS key derivation instruction message is a random number generated by a core network node, the UMTS key derivation instruction message from the core network node of the LTE system; and to derive, according to the current non-access stratum count value of the LTE system and the non-access stratum root key to the LTE system, or according to the non-access stratum root key to the LTE system and the random number generated by the core network node of the LTE system, the UMTS integrity key and cipher key.

23. The user equipment according to claim 21, wherein the computer hardware is further configured to receive, when the LTE system root key is an access layer root key to the LTE system, the count value of the LTE system is a packet data convergence protocol count value of the LTE system, and the random number carried in the UMTS key derivation instruction message is a random number generated by an access network node of the LTE system, the UMTS key derivation instruction message from the access network node of the LTE system, and to derive, according to the packet data convergence protocol count value of the LTE system and the access layer root key to the LTE system, or according to the access layer root key to the LTE system and the random number generated by the access network node of the LTE system, the UMTS integrity key and cipher key.

24. A control node for a universal mobile telecommunication system (UMTS), applied to a UMTS-long term evolution (LTE) system resource convergence scenario that has a base station as an anchor point, the UMTS control node comprising:

non-transitory computer readable storage medium to store program(s), and computer hardware configured, including configured by the program(s), to implement:

to receive a UMTS integrity key and cipher key as well as a user equipment (UE) security capability from an access network node of the LTE system after a Radio Bearer between the UE, which is served by the LTE system, and the UMTS control node is established; and to send, through the access network node of the LTE system, a security mode command message under integrity protection to UE, wherein the security mode command message carries: an integrity algorithm and a cipher algorithm that are selected by the UMTS control node according to the UE security capability, the UE security capability and parameter values generated by the UMTS control node, and an integrity message authentication code generated by the UMTS control node according to the UMTS integrity key, the parameter values generated by the UMTS control node, an integrity sequence number, the security mode command message, and a direction indication.

25. The UMTS control node according to claim 24, wherein the computer hardware is further configured to:

after the security mode command message is sent to the UE, receive a security mode command complete message under integrity protection that is sent, through the access network node of the LTE system, from the UE, wherein the UE sends the security mode command complete message to the UMTS control node through the access network node of the LTE system in the following scenario: after the UE receives the security mode command message, the UE generates an integrity message authentication code according to a UE integrity key to UMTS, the integrity sequence number, the direction indication, the security mode command message, and parameter values carried in the security mode command message; additionally, the UE determines that the integrity message authentication code generated by the UE is consistent with an integrity message authentication code carried in the security mode command message and the UE security capability carried in the security mode command message is consistent with a security capability of the UE itself.

\* \* \* \* \*